(12) United States Patent
Soliman et al.

(10) Patent No.: US 12,537,312 B2
(45) Date of Patent: Jan. 27, 2026

(54) SYSTEMS AND METHODS FOR SPLIT CONTROL OF RECONFIGURABLE INTELLIGENT SURFACES

(71) Applicant: Apple Inc., Cupertino, CA (US)

(72) Inventors: Ahmed M Soliman, Munich (DE); Danila Zaev, Munich (DE); Kenza Hamidouche, Cupertino, CA (US); Benedikt Schweizer, Munich (DE); Ayman F Naguib, Cupertino, CA (US); Norman Goris, Dortmund (DE); Said Medjkouh, San Diego, CA (US)

(73) Assignee: Apple Inc., Cupertino, CA (US)

( * ) Notice: Subject to any disclaimer, the term of this patent is extended or adjusted under 35 U.S.C. 154(b) by 448 days.

(21) Appl. No.: 18/160,245

(22) Filed: Jan. 26, 2023

(65) Prior Publication Data

US 2024/0258708 A1    Aug. 1, 2024

(51) Int. Cl.
    *H01Q 19/10*    (2006.01)
    *H04B 7/06*     (2006.01)
    *H04B 7/08*     (2006.01)

(52) U.S. Cl.
    CPC ........... *H01Q 19/10* (2013.01); *H04B 7/0639* (2013.01); *H04B 7/08* (2013.01)

(58) Field of Classification Search
    CPC ........ H01Q 19/10; H04B 7/0639; H04B 7/08; H04B 7/04013

(Continued)

(56) References Cited

U.S. PATENT DOCUMENTS

2021/0013619 A1*  1/2021  Alkhateeb .......... H04B 7/04013
2022/0059943 A1*  2/2022  Saab .................... H04B 7/0617

(Continued)

FOREIGN PATENT DOCUMENTS

| CN | 111983560 B | * | 12/2022 | .............. G01S 11/06 |
| WO | WO-2022197369 A2 | * | 9/2022 | ........... G01S 5/0236 |
| WO | WO-2023278910 A1 | * | 1/2023 | ........... G01S 5/0036 |

OTHER PUBLICATIONS

Vahid Jamali et al., Low-to-Zero-Overhead IRS Reconfiguration: Decoupling Illumination and Channel Estimation, IEEE Communications Letters, Jan. 2022, pp. 1-8, vol. 26, IEEE Publishing, New York, NY, United States.

*Primary Examiner* — Mahendra R Patel
(74) *Attorney, Agent, or Firm* — Treyz Law Group, P.C.; Michael H. Lyons

(57) ABSTRACT

A communication system may include a base station (BS), a user equipment (UE) device, a reconfigurable intelligent surface (RIS) having a local controller, and a remote controller. Antenna elements on the RIS may reflect signals between the BS and UE while exhibiting reflection coefficients. The remote controller may transmit a control model and the UE may transmit local information to the local controller, which generates the reflection coefficients based on the local information and control model. Alternatively, the remote controller may transmit the control model to the UE and a codebook to the RIS. The UE may transmit an identifier to the RIS based on local information and the control model. The local controller may implement reflection coefficients of a codebook entry identified by the identifier. Splitting control of the RIS in these ways may minimize communication overhead, provide coverage extension for the UE, and optimize privacy.

18 Claims, 11 Drawing Sheets

(58) Field of Classification Search
USPC .......................................................... 370/328
See application file for complete search history.

(56) References Cited

U.S. PATENT DOCUMENTS

| | | | |
|---|---|---|---|
| 2022/0123803 A1* | 4/2022 | Rimalapudi | H04B 7/0626 |
| 2022/0344826 A1* | 10/2022 | Chowdhury | H01Q 19/18 |
| 2022/0407222 A1* | 12/2022 | Zhu | H04W 24/10 |
| 2023/0086903 A1* | 3/2023 | Khojastepour | G01S 3/14 |
| | | | 342/201 |
| 2023/0093595 A1* | 3/2023 | Nam | H04W 56/0035 |
| | | | 375/262 |
| 2023/0101393 A1* | 3/2023 | Dai | H04W 72/23 |
| | | | 726/6 |
| 2023/0239723 A1* | 7/2023 | Gurelli | H04L 45/24 |
| | | | 370/329 |
| 2024/0014884 A1* | 1/2024 | Bengtsson | H04B 7/15528 |
| 2024/0088987 A1* | 3/2024 | Meyer | H04B 7/04013 |
| 2024/0097759 A1* | 3/2024 | Soliman | H04B 7/0632 |
| 2024/0171222 A1* | 5/2024 | Capolino | H01Q 15/0066 |
| 2024/0171447 A1* | 5/2024 | Hemadeh | H04L 27/36 |
| 2024/0214967 A1* | 6/2024 | Zorgui | H04B 7/04013 |
| 2024/0250741 A1* | 7/2024 | Sambhwani | H04B 7/145 |
| 2024/0275432 A1* | 8/2024 | Ly | H04B 7/04013 |
| 2025/0016812 A1* | 1/2025 | Zhang | H04W 72/54 |

* cited by examiner

SYSTEMS AND METHODS FOR SPLIT CONTROL OF RECONFIGURABLE INTELLIGENT SURFACES

FIELD

This disclosure relates generally to electronic devices and, more particularly, to electronic devices with wireless circuitry.

BACKGROUND

Electronic devices are often provided with wireless capabilities. An electronic device with wireless capabilities has wireless circuitry that includes one or more antennas. The wireless circuitry is used to perform communications using radio-frequency signals conveyed by the antennas.

As software applications on electronic devices become more data-intensive over time, demand has grown for electronic devices that support wireless communications at higher data rates. However, the maximum data rate supported by electronic devices is limited by the frequency of the radio-frequency signals. As the frequency of the radio-frequency signals increases, it can become increasingly difficult to perform satisfactory wireless communications because the signals become subject to significant over-the-air attenuation and typically require line-of-sight.

SUMMARY

A communication system may include a wireless base station (BS), one or more user equipment (UE) devices, one or more reconfigurable intelligent surfaces (RIS's), and a remote controller for the RIS's. Each RIS may include a local controller. The RIS may include antenna elements that reflect wireless signals between a base station and a UE device while antenna elements on the RIS are configured to exhibit a set of reflection coefficients. Selection and adjustment of the set of reflection coefficients may be split between the remote controller, the local controller, and the UE device.

For example, the remote controller may transmit a control model to the local controller. The UE device may transmit local information to the local controller. The local controller may generate the set of reflection coefficients by inputting the local information to the control model. As another example, the remote controller may transmit the control model to the UE device and may transmit a paired codebook to the RIS. The UE device may generate a RIS configuration identifier by inputting local information about the UE device and optionally the RIS to the control model. The UE device may transmit the RIS configuration identifier to the local controller. The local controller may select an entry of the codebook identified by the RIS configuration identifier and may control the antenna elements of the RIS to implement the set of reflection coefficients corresponding to the selected entry of the codebook.

If desired, the system may be adapted to perform machine learning or artificial intelligence training, federated learning, and/or reinforcement learning-based optimization. The RIS may serve multiple UE devices and/or the remote controller may serve multiple RIS's. The served UE may forward the codebook and/or the control model to the RIS if the RIS is out of range of the remote controller. Splitting control of the RIS in these ways may serve to minimize communication overhead associated with reconfiguring the RIS, may help to provide coverage extension for the UE device, and may optimize privacy for the UE device.

An aspect of the disclosure provides a method of operating a reconfigurable intelligent surface (RIS). The method can include receiving a first signal from a first electronic device. The method can include receiving a second signal from a second electronic device that is different from the first electronic device. The method can include reflecting a third signal towards the second electronic device using an array of antenna elements, the array of antenna elements being configured to exhibit a set of reflection coefficients selected based on the first signal and the second signal.

An aspect of the disclosure provides a method of operating a first electronic device. The method can include receiving a first signal from a second electronic device. The method can include transmitting a second signal to a reconfigurable intelligent surface (RIS) that identifies an entry of a codebook of the RIS that is selected based on the first signal. The method can include transmitting a third signal towards the RIS, the RIS being configured to reflect the third signal based on the entry of the codebook identified by the second signal.

An aspect of the disclosure provides a method of operating a first electronic device. The method can include transmitting a codebook for a reconfigurable intelligent surface (RIS) to the RIS. The method can include transmitting a function to a second electronic device, the second electronic device being configured to transmit a signal to the RIS identifying an entry of the codebook that is selected by the second electronic device based on the function and information about the second UE device.

DETAILED DESCRIPTION

Figure 1:
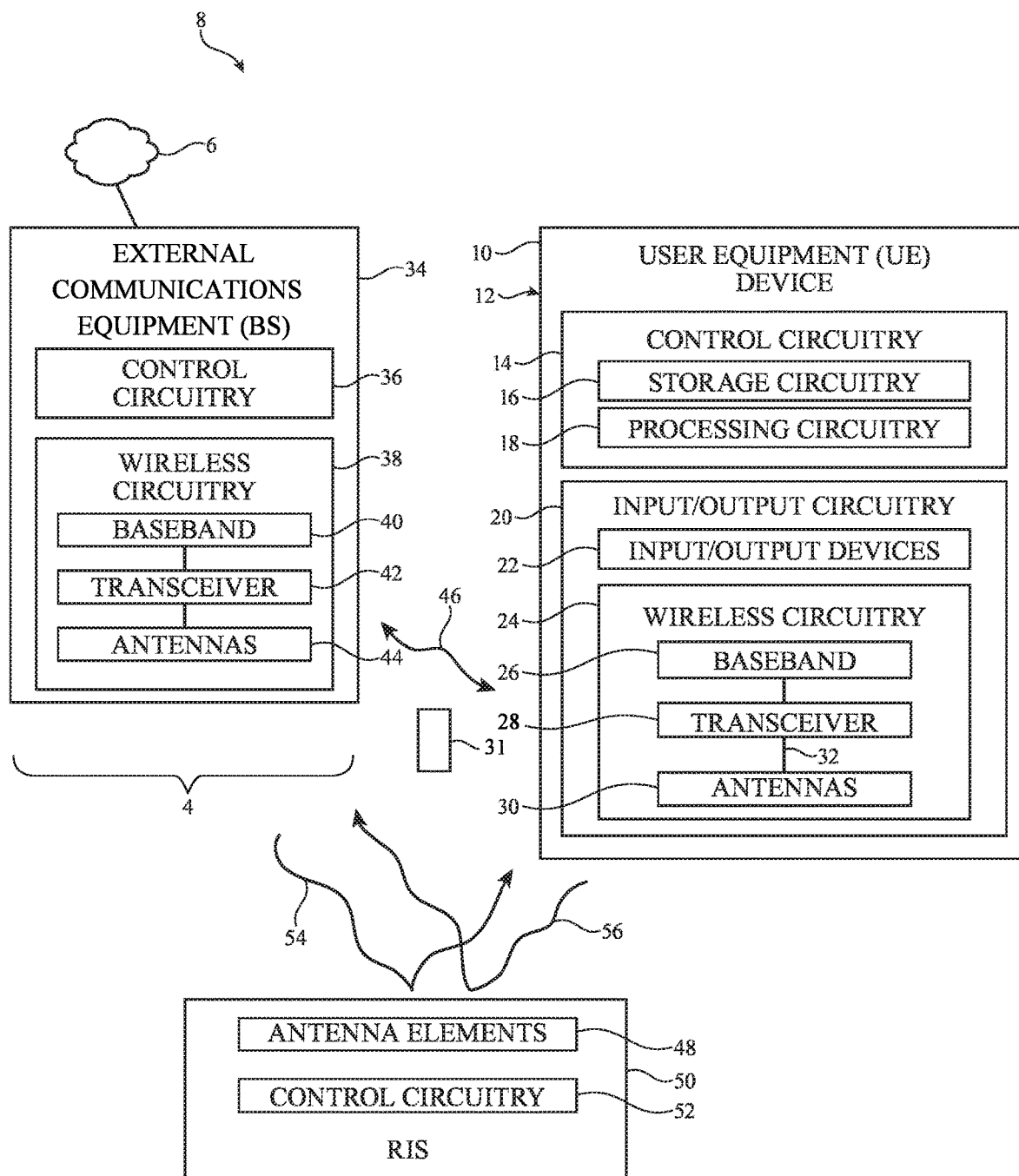
FIG. 1 is a schematic block diagram of an illustrative communications system having a user equipment (UE) device, external communications equipment such as a wireless base station, and a reconfigurable intelligent surface (RIS) in accordance with some embodiments.

FIG. 1 is a schematic diagram of an illustrative communications system 8 (sometimes referred to herein as communications network 8) for conveying wireless data between communications terminals. Communications system 8 may include network nodes (e.g., communications terminals). The network nodes may include user equipment (UE) such as one or more UE devices 10 (sometimes referred to herein simply as UE 10). The network nodes may also include external communications equipment (e.g., communications equipment other than UE devices 10) such as external communications equipment 34. External communications equipment 34 (sometimes referred to herein simply as external equipment 34) may include one or more electronic devices and may be a wireless base station, wireless access point, or other wireless equipment for example. An implementation in which external communications equipment 34 forms a wireless base station (BS) is described herein as an example. External communications equipment 34 may therefore sometimes be referred to herein as BS 34. UE device 10 and BS 34 may communicate with each other using one or more wireless communications links. If desired, UE devices 10 may wirelessly communicate with BS 34 without passing communications through any other intervening network nodes in communications system 8 (e.g., UE devices 10 may communicate directly with BS 34 over-the-air).

BS 34 may be communicably coupled to one or more other network nodes 6 in a larger communications network 4 via wired and/or wireless links. Network 4 may include one or more wired communications links (e.g., communications links formed using cabling such as ethernet cables, radio-frequency cables such as coaxial cables or other transmission lines, optical fibers or other optical cables, etc.), one or more wireless communications links (e.g., short range wireless communications links that operate over a range of inches, feet, or tens of feet, medium range wireless communications links that operate over a range of hundreds of feet, thousands of feet, miles, or tens of miles, and/or long range wireless communications links that operate over a range of hundreds or thousands of miles, etc.), communications gateways, wireless access points, base stations, switches, routers, servers, modems, repeaters, telephone lines, network cards, line cards, portals, user equipment (e.g., computing devices, mobile devices, etc.), etc. Network 4 may include communications (network) nodes or terminals coupled together using these components or other components (e.g., some or all of a mesh network, relay network, ring network, local area network, wireless local area network, personal area network, cloud network, star network, tree network, or networks of communications nodes having other network topologies), the Internet, combinations of these, etc. UE devices 10 may send data to and/or may receive data from other nodes or terminals in network 4 via BS 34 (e.g., BS 34 may serve as an interface between user equipment devices 10 and the rest of the larger communications network). Network 4 may be managed, operated, controlled, or run by a corresponding network service provider (e.g., a cellular network carrier).

User equipment (UE) device 10 of FIG. 1 is an electronic device (sometimes referred to herein as electronic device 10 or device 10) and may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses, goggles, or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, equipment that implements the functionality of two or more of these devices, or other electronic equipment.

As shown in the functional block diagram of FIG. 1, UE device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, part or all of housing 12 may be formed from dielectric or other low-conductivity material (e.g., glass, ceramic, plastic, sapphire, etc.). In other situations, housing 12 or at least some of the structures that make up housing 12 may be formed from metal elements.

UE device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more processors such as microprocessors, microcontrollers, digital signal processors, host processors, baseband processor integrated circuits, application specific integrated circuits, central processing units (CPUs), graphics processing units (GPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.1 lad protocols (e.g., ultra-wideband protocols), cellular telephone protocols (e.g., 3G protocols, 4G (LTE) protocols, 3GPP Fifth Generation (5G) New Radio (NR) protocols, Sixth Generation (6G) protocols, sub-THz protocols, THz protocols, etc.), antenna diversity protocols, satellite navigation system protocols (e.g., global positioning system (GPS) protocols, global navigation satellite system (GLONASS) protocols, etc.), antenna-based spatial ranging protocols, optical communications protocols, or any other desired communications protocols. Each communications protocol may be associated with a corresponding radio access technology (RAT) that specifies the physical connection methodology used in implementing the protocol.

UE device 10 may include input-output circuitry 20. Input-output circuitry 20 may include input-output devices 22. Input-output devices 22 may be used to allow data to be supplied to UE device 10 and to allow data to be provided from UE device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to UE device 10 using wired or wireless connections (e.g., some of input-output devices 22 may be peripherals that are coupled to a main processing unit or other portion of UE device 10 via a wired or wireless link).

Input-output circuitry 20 may include wireless circuitry 24 to support wireless communications. Wireless circuitry 24 (sometimes referred to herein as wireless communications circuitry 24) may include baseband circuitry such as baseband circuitry 26 (e.g., one or more baseband processors and/or other circuitry that operates at baseband), radio-frequency (RF) transceiver circuitry such as transceiver 28, and one or more antennas 30. If desired, wireless circuitry 24 may include multiple antennas 30 that are arranged into a phased antenna array (sometimes referred to as a phased array antenna) that conveys radio-frequency signals within a corresponding signal beam that can be steered in different directions. Baseband circuitry 26 may be coupled to transceiver 28 over one or more baseband data paths. Transceiver 28 may be coupled to antennas 30 over one or more radio-frequency transmission line paths 32. If desired, radio-frequency front end circuitry may be disposed on radio-frequency transmission line path(s) 32 between transceiver 28 and antennas 30.

In the example of FIG. 1, wireless circuitry 24 is illustrated as including only a single transceiver 28 and a single radio-frequency transmission line path 32 for the sake of clarity. In general, wireless circuitry 24 may include any desired number of transceivers 28, any desired number of radio-frequency transmission line paths 32, and any desired number of antennas 30. Each transceiver 28 may be coupled to one or more antennas 30 over respective radio-frequency transmission line paths 32. Radio-frequency transmission line path 32 may be coupled to antenna feeds on one or more antenna 30. Each antenna feed may, for example, include a positive antenna feed terminal and a ground antenna feed terminal. Radio-frequency transmission line path 32 may have a positive transmission line signal path that is coupled to the positive antenna feed terminal and may have a ground transmission line signal path that is coupled to the ground antenna feed terminal. This example is merely illustrative and, in general, antennas 30 may be fed using any desired antenna feeding scheme.

Radio-frequency transmission line path 32 may include transmission lines that are used to route radio-frequency antenna signals within device 10. Transmission lines in device 10 may include coaxial cables, microstrip transmission lines, stripline transmission lines, edge-coupled microstrip transmission lines, edge-coupled stripline transmission lines, transmission lines formed from combinations of transmission lines of these types, etc. Transmission lines in device 10 such as transmission lines in radio-frequency transmission line path 32 may be integrated into rigid and/or flexible printed circuit boards. In one embodiment, radio-frequency transmission line paths such as radio-frequency transmission line path 32 may also include transmission line conductors integrated within multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

In performing wireless transmission (e.g., in an uplink (UL) direction from UE device 10 to BS 34), baseband circuitry 26 may provide baseband signals to transceiver 28 (e.g., baseband signals that include wireless data for transmission). Transceiver 28 may include circuitry for converting the baseband signals received from baseband circuitry 26 into corresponding radio-frequency signals (e.g., for modulating the wireless data onto one or more carriers for transmission, synthesizing a transmit signal, etc.). For example, transceiver 28 may include mixer circuitry for up-converting the baseband signals to radio frequencies prior to transmission over antennas 30. Transceiver 28 may also include digital to analog converter (DAC) and/or analog to digital converter (ADC) circuitry for converting signals between digital and analog domains. Transceiver 28 may transmit the radio-frequency signals over antennas 30 via radio-frequency transmission line path 32. Antennas 30 may transmit the radio-frequency signals to external wireless equipment by radiating the radio-frequency signals into free space.

In performing wireless reception (e.g., in a downlink (DL) direction from BS 34 to UE device 10), antennas 30 may receive radio-frequency signals from BS 34. The received radio-frequency signals may be conveyed to transceiver 28 via radio-frequency transmission line path 32. Transceiver 28 may include circuitry for converting the received radio-frequency signals into corresponding baseband signals. For example, transceiver 28 may include mixer circuitry for down-converting the received radio-frequency signals to baseband frequencies prior to conveying the baseband signals to baseband circuitry 26 and may include demodulation circuitry for demodulating wireless data from the received signals.

Front end circuitry disposed on radio-frequency transmission line path 32 may include radio-frequency front end components that operate on radio-frequency signals conveyed over radio-frequency transmission line path 32. If desired, the radio-frequency front end components may be formed within one or more radio-frequency front end modules (FEMs). Each FEM may include a common substrate such as a printed circuit board substrate for each of the radio-frequency front end components in the FEM. The radio-frequency front end components in the front end circuitry may include switching circuitry (e.g., one or more radio-frequency switches), radio-frequency filter circuitry (e.g., low pass filters, high pass filters, notch filters, band pass filters, multiplexing circuitry, duplexer circuitry, diplexer circuitry, triplexer circuitry, etc.), impedance matching circuitry (e.g., circuitry that helps to match the impedance of antennas 30 to the impedance of radio-frequency transmission line path 32), antenna tuning circuitry (e.g., networks of capacitors, resistors, inductors, and/or switches that adjust the frequency response of antennas 30), radio-frequency amplifier circuitry (e.g., power amplifier circuitry and/or low-noise amplifier circuitry), radio-frequency coupler circuitry, charge pump circuitry, power management circuitry, digital control and interface circuitry, and/or any other desired circuitry that operates on the radio-frequency signals transmitted and/or received by antennas 30.

While control circuitry 14 is shown separately from wireless circuitry 24 in the example of FIG. 1 for the sake of clarity, wireless circuitry 24 may include processing circuitry that forms a part of processing circuitry 18 and/or storage circuitry that forms a part of storage circuitry 16 of control circuitry 14 (e.g., portions of control circuitry 14 may be implemented on wireless circuitry 24). As an example, baseband circuitry 26 and/or portions of transceiver 28 (e.g., a host processor on transceiver 28) may form a part of control circuitry 14. Baseband circuitry 26 may, for example, access a communication protocol stack on control circuitry 14 (e.g., storage circuitry 16) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer.

The term "convey wireless signals" as used herein means the transmission and/or reception of the wireless signals (e.g., for performing unidirectional and/or bidirectional wireless communications with external wireless communications equipment). Antennas 30 may transmit the wireless signals by radiating the signals into free space (or to free space through intervening device structures such as a dielectric cover layer). Antennas 30 may additionally or alternatively receive the wireless signals from free space (e.g., through intervening devices structures such as a dielectric cover layer). The transmission and reception of wireless signals by antennas 30 each involve the excitation or resonance of antenna currents on an antenna resonating (radiating) element in the antenna by the wireless signals within the frequency band(s) of operation of the antenna.

Transceiver circuitry 26 may use antenna(s) 30 to transmit and/or receive wireless signals that convey wireless communications data between device 10 and BS 34 (e.g., one or more other devices such as device 10, a wireless access point or base station, etc.). The wireless communications data may be conveyed bidirectionally or unidirectionally. The wireless communications data may, for example, include data that has been encoded into corresponding data packets such as wireless data associated with a telephone call, streaming media content, internet browsing, wireless data associated with software applications running on device 10, email messages, etc.

Additionally or alternatively, wireless circuitry 24 may use antenna(s) 30 to perform wireless (radio-frequency) sensing operations. The sensing operations may allow device 10 to detect (e.g., sense or identify) the presence, location, orientation, and/or velocity (motion) of objects external to device 10. Control circuitry 14 may use the detected presence, location, orientation, and/or velocity of the external objects to perform any desired device operations. As examples, control circuitry 14 may use the detected presence, location, orientation, and/or velocity of the external objects to identify a corresponding user input for one or more software applications running on device 10 such as a gesture input performed by the user's hand(s) or other body parts or performed by an external stylus, gaming controller, head-mounted device, or other peripheral devices or accessories, to determine when one or more antennas 30 needs to be disabled or provided with a reduced maximum transmit power level (e.g., for satisfying regulatory limits on radio-frequency exposure), to determine how to steer (form) a radio-frequency signal beam produced by antennas 30 for wireless circuitry 24 (e.g., in scenarios where antennas 30 include a phased array of antennas 30), to map or model the environment around device 10 (e.g., to produce a software model of the room where device 10 is located for use by an augmented reality application, gaming application, map application, home design application, engineering application, etc.), to detect the presence of obstacles in the vicinity of (e.g., around) device 10 or in the direction of motion of the user of device 10, etc. The sensing operations may, for example, involve the transmission of sensing signals (e.g., radar waveforms), the receipt of corresponding reflected signals (e.g., the transmitted waveforms that have reflected off of external objects), and the processing of the transmitted signals and the received reflected signals (e.g., using a radar scheme).

Wireless circuitry 24 may transmit and/or receive wireless signals within corresponding frequency bands of the electromagnetic spectrum (sometimes referred to herein as communications bands or simply as "bands"). The frequency bands handled by wireless circuitry 24 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, 6G bands at sub-THz or THz frequencies greater than about 100 GHz, etc.), other centimeter or millimeter wave frequency bands between 10-100 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Over time, software applications on electronic devices such as device 10 have become more and more data intensive. Wireless circuitry on the electronic devices therefore needs to support data transfer at higher and higher data rates. In general, the data rates supported by the wireless circuitry are proportional to the frequency of the wireless signals conveyed by the wireless circuitry (e.g., higher frequencies can support higher data rates than lower frequencies). Wireless circuitry 24 may convey centimeter and millimeter wave signals to support relatively high data rates (e.g., because centimeter and millimeter wave signals are at relatively high frequencies between around 10 GHz and 100 GHz). However, the data rates supported by centimeter and millimeter wave signals may still be insufficient to meet all the data transfer needs of device 10. To support even higher data rates such as data rates up to 5-100 Gbps or higher, wireless circuitry 24 may convey wireless signals at frequencies greater than about 100 GHz.

As shown in FIG. 1, wireless circuitry 24 may transmit wireless signals 46 to BS 34 and/or may receive wireless signals 46 from BS 34. Wireless signals 46 may be tremendously high frequency (THF) signals (e.g., sub-THz or THz signals) at frequencies greater than around 100 GHz (e.g., between 100 GHz and 1 THz, between 80 GHz and 10 THz, between 100 GHz and 10 THz, between 100 GHz and 2 THz, between 200 GHz and 1 THz, between 300 GHz and 1 THz, between 300 GHz and 2 THz, between 70 GHz and 2 THz, between 300 GHz and 10 THz, between 100 GHz and 800 GHz, between 200 GHz and 1.5 THz, or within any desired sub-THz, THz, THF, or sub-millimeter frequency band such as a 6G frequency band), may be millimeter (mm) or centimeter (cm) wave signals between 10 GHz and around 70 GHz (e.g., 5G NR FR2 signals), or may be signals at frequencies less than 10 GHz (e.g., 5G NR FR1 signals, LTE signals, 3G signals, 2G signals, WLAN signals, Bluetooth signals, UWB signals, etc.).

If desired, the high data rates supported by THF signals may be leveraged by device 10 to perform cellular telephone voice and/or data communications (e.g., while supporting spatial multiplexing to provide further data bandwidth), to perform spatial ranging operations such as radar operations to detect the presence, location, and/or velocity of objects external to device 10, to perform automotive sensing (e.g., with enhanced security), to perform health/body monitoring on a user of device 10 or another person, to perform gas or chemical detection, to form a high data rate wireless connection between device 10 and another device or peripheral device (e.g., to form a high data rate connection between a display driver on device 10 and a display that displays ultra-high resolution video), to form a remote radio head (e.g., a flexible high data rate connection), to form a THF chip-to-chip connection within device 10 that supports high data rates (e.g., where one antenna 30 on a first chip in device 10 transmits THF signals to another antenna 30 on a second chip in device 10), and/or to perform any other desired high data rate operations.

In implementations where wireless circuitry 24 conveys THF signals, the wireless circuitry may include electro-optical circuitry if desired. The electro-optical circuitry may include light sources that generate first and second optical local oscillator (LO) signals. The first and second optical LO signals may be separated in frequency by the intended frequency of wireless signals 46. Wireless data may be modulated onto the first optical LO signal and one of the optical LO signals may be provided with an optical phase shift (e.g., to perform beamforming). The first and second optical LO signals may illuminate a photodiode that produces current at the frequency of wireless signals 46 when illuminated by the first and second optical LO signals. An antenna resonating element of a corresponding antenna 30 may convey the current produced by the photodiode and may radiate corresponding wireless signals 46. This is merely illustrative and, in general, wireless circuitry 24 may generate wireless signals 46 using any desired techniques.

Antennas 30 may be formed using any desired antenna structures. For example, antennas 30 may include antennas with resonating elements that are formed from loop antenna structures, patch antenna structures, inverted-F antenna structures, slot antenna structures, planar inverted-F antenna structures, helical antenna structures, monopole antennas, dipoles (e.g., planar dipole antennas such as bowtie antennas), hybrids of these designs, etc. Parasitic elements may be included in antennas 30 to adjust antenna performance.

If desired, two or more of antennas 30 may be integrated into a phased antenna array (sometimes referred to herein as a phased array antenna or an array of antenna elements). Each antenna 30 in the phased antenna array forms a respective antenna element of the phased antenna array. Each antenna 30 in the phased antenna array has a respective phase and magnitude controller that imparts the radio-frequency signals conveyed by that antenna with a respective phase and magnitude. The respective phases and magnitudes may be selected (e.g., by control circuitry 14) to configure the radio-frequency signals conveyed by the antennas 30 in the phased antenna array to constructively and destructively interfere in such a way that the radio-frequency signals collectively form a signal beam (e.g., a signal beam of wireless signals 46) oriented in a corresponding beam pointing direction (e.g., a direction of peak gain).

The control circuitry may adjust the phases and magnitudes to change (steer) the orientation of the signal beam (e.g., the beam pointing direction) to point in other directions over time. This process may sometimes also be referred to herein as beamforming. Beamforming may boost the gain of wireless signals 46 to help overcome over-the-air attenuation and the signal beam may be steered over time to point towards BS 34 even as the position and orientation of UE device 10 changes. The signal beams formed by antennas 30 of UE device 10 may sometimes be referred to herein as UE beams or UE signal beams. Each UE beam may be oriented in a different respective direction (e.g., a beam pointing direction of peak signal gain). Each UE beam may be labeled by a corresponding UE beam index. UE device 10 may include or store a codebook (sometimes referred to herein as a UE codebook) that maps each of its UE beam indices to the corresponding phase and magnitude settings for each antenna 30 in a phased antenna array that configure the phased antenna array to form the UE beam associated with that UE beam index.

As shown in FIG. 1, BS 34 may also include control circuitry 36 (e.g., control circuitry having similar components and/or functionality as control circuitry 14 in UE device 10) and wireless circuitry 38 (e.g., wireless circuitry having similar components and/or functionality as wireless circuitry 24 in UE device 10). Wireless circuitry 38 may include baseband circuitry 40 and transceiver 42 (e.g., transceiver circuitry having similar components and/or functionality as transceiver circuitry 28 in UE device 10) coupled to two or more antennas 44 (e.g., antennas having similar components and/or functionality as antennas 30 in UE device 10). Antennas 44 may be arranged in one or more phased antenna arrays (e.g., phased antenna arrays that perform beamforming similar to phased antenna arrays of antennas 30 on UE device 10).

BS 34 may use wireless circuitry 38 to transmit a signal beam of wireless signals 46 to UE device 10 (e.g., as DL signals transmitted in a DL direction) and/or to receive a signal beam of wireless signals 46 transmitted by UE device 10 (e.g., as UL signals transmitted in a UL direction). The signal beams formed by antennas 44 of BS 34 may sometimes be referred to herein as BS beams or BS signal beams. Each BS beam may be oriented in a different respective direction (e.g., a beam pointing direction of peak signal gain). Each BS beam may be labeled by a corresponding BS beam index. BS 34 may include or store a codebook (sometimes referred to herein as a BS codebook) that maps each of its BS beam indices to the corresponding phase and magnitude settings for each antenna 44 in a phased antenna array that configure the phased antenna array to form the BS beam associated with that BS beam index.

While communications at high frequencies allow for extremely high data rates (e.g., greater than 100 Gbps), wireless signals 46 at such high frequencies are subject to significant attenuation during propagation over-the-air. Integrating antennas 30 and 44 into phased antenna arrays helps to counteract this attenuation by boosting the gain of the signals within a signal beam. However, signal beams are highly directive and may require a line-of-sight (LOS) between UE device 10 and BS 34. If an external object is present between BS 34 and UE device 10, the external object may block the LOS between UE device 10 and BS 34, which can disrupt wireless communications using wireless signals 46. If desired, a reflective device such as a reconfigurable intelligent surface (RIS) may be used to allow UE device 10 and BS 34 to continue to communicate using wireless signals 46 even when an external object blocks the LOS between UE device 10 and BS 34 (or whenever direct over-the-air communications between BS 34 and UE device 10 otherwise exhibits less than optimal performance).

As shown in FIG. 1, system 8 may include one or more reconfigurable intelligent surfaces (RIS's) such as RIS 50. RIS 50 may sometimes also be referred to as an intelligent reconfigurable surface, an intelligent reflective/reflecting surface, a reflective intelligent surface, a reflective surface, a reflective device, a reconfigurable reflective device, a reconfigurable reflective surface, or a reconfigurable surface. BS 34 may be separated from UE device 10 by a line-of-sight (LOS) path. In some circumstances, an external object such as object 31 may block the LOS path. Object 31 may be, for example, part of a building such as a wall, window, floor, or ceiling (e.g., when UE device 10 is located inside), furniture, a body or body part, an animal, a cubicle wall, a vehicle, a landscape feature, or other obstacles or objects that may block the LOS path between BS 34 and UE device 10.

In the absence of external object 31, BS 34 may form a corresponding BS beam of wireless signals 46 oriented in the direction of UE device 10 and UE device 10 may form a corresponding UE beam of wireless signals 46 oriented in the direction of BS 34. UE device 10 and BS 34 can then convey wireless signals 46 over their respective signal beams and the LOS path. However, the presence of external object 31 prevents wireless signals 46 from being conveyed over the LOS path.

RIS 50 may be placed or disposed within system 8 in such a way so as to allow RIS 50 to reflect wireless signals 46 between UE device 10 and BS 34 despite the presence of external object 31 within the LOS path. More generally, RIS 50 may be used to reflect wireless signals 46 between UE device 10 and BS 34 when reflection via RIS 50 offers superior radio-frequency propagation conditions relative to the LOS path regardless of the presence of external object 31 (e.g., when the LOS path between BS 34 and RIS 50 and the LOS path between RIS 50 and UE device 10 exhibit superior propagation/channel conditions than the direct LOS path between UE device 10 and BS 34).

When RIS 50 is placed within system 8, BS 34 may transmit wireless signals 46 towards RIS 50 (e.g., within a BS beam oriented towards RIS 50 rather than towards UE device 10) and RIS 50 may reflect the wireless signals towards UE device 10, as shown by arrow 54. Conversely, UE device 10 may transmit wireless signals 46 towards RIS 50 (e.g., within a UE beam oriented towards RIS 50 rather than towards BS 34) and RIS 50 may reflect the wireless signals towards BS 34, as shown by arrow 56.

RIS 50 is an electronic device that includes a two-dimensional surface of engineered material having reconfigurable properties for performing (e.g., reflecting) communications between BS 34 and UE device 10. RIS 50 may include an array of reflective elements such as antenna elements 48 on an underlying substrate. Antenna elements 48 may also sometimes be referred to herein as reflective elements 48, reconfigurable antenna elements 48, reconfigurable reflective elements 48, reflectors 48, or reconfigurable reflectors 48.

The substrate may be a rigid or flexible printed circuit board, a package, a plastic substrate, meta-material, or any other desired substrate. The substrate may be planar or may be curved in one or more dimensions. If desired, the substrate and antenna elements 48 may be enclosed within a housing. The housing may be formed from materials that are transparent to wireless signals 46. If desired, RIS 50 may be disposed (e.g., layered) on an underlying electronic device. RIS 50 may also be provided with mounting structures (e.g., adhesive, brackets, a frame, screws, pins, clips, etc.) that can be used to affix or attach RIS 50 to an underlying structure such as another electronic device, a wall, the ceiling, the floor, furniture, etc. Disposing RIS 50 on a ceiling, wall, window, column, pillar, or at or adjacent to the corner of a room (e.g., a corner where two walls intersect, where a wall intersects with the floor or ceiling, where two walls and the floor intersect, or where two walls and the ceiling intersect), as examples, may be particularly helpful in allowing RIS 50 to reflect wireless signals between BS 34 and UE device 10 around various objects 31 that may be present (e.g., when BS 34 is located outside and UE device 10 is located inside, when BS 34 and UE device 10 are both located inside or outside, etc.).

RIS 50 may be a passive adaptively controlled reflecting surface and a powered device that includes control circuitry 52 that helps to control the operation of antenna elements 48 (e.g., one or more processors in control circuitry such as control circuitry 14). When electro-magnetic (EM) energy waves (e.g., waves of wireless signals 46) are incident on RIS 50, the wave is reflected by each antenna element 48 via re-radiation by each antenna element 48 with a respective phase and amplitude response. Antenna elements 48 may include passive reflectors (e.g., antenna resonating elements or other radio-frequency reflective elements). Each antenna element 48 may include an adjustable device that is programmed, set, and/or controlled by control circuitry 52 (e.g., using a control signal that includes a respective beamforming coefficient) to configure that antenna element 48 to reflect incident EM energy with the respective phase and amplitude response. The adjustable device may be a programmable photodiode, an adjustable impedance matching circuit, an adjustable phase shifter, an adjustable amplifier, a varactor diode, an antenna tuning circuit, etc.

Control circuitry 52 on RIS 50 may configure the reflective response of antenna elements 48 on a per-element or per-group-of-elements basis (e.g., where each antenna element has a respective programmed phase and amplitude response or the antenna elements in different sets/groups of antenna elements are each programmed to share the same respective phase and amplitude response across the set/group but with different phase and amplitude responses between sets/groups). The scattering, absorption, reflection, and diffraction properties of the entire RIS can therefore be changed overtime and controlled (e.g., by software running on the RIS or other devices communicably coupled to the RIS such as BS 34 or UE device 10).

One way of achieving the per-element phase and amplitude response of antenna elements 48 is by adjusting the impedance of antenna elements 48, thereby controlling the complex reflection coefficient that determines the change in amplitude and phase of the re-radiated signal. The control circuitry 52 on RIS 50 may configure antenna elements 48 to exhibit impedances that serve to reflect wireless signals 46 incident from particular incident angles onto particular output angles. The antenna elements 48 (e.g., the antenna impedances) may be adjusted to change the angle with which incident wireless signals 46 are reflected off of RIS 50.

For example, the control circuitry on RIS 50 may configure antenna elements 48 to reflect wireless signals 46 transmitted by BS 34 towards UE device 10 (as shown by arrow 54) and to reflect wireless signals 46 transmitted by UE device 10 towards BS 34 (as shown by arrow 56). In such an example, control circuitry 36 may configure (e.g., program) a phased antenna array of antennas 44 on BS 34 to form a BS beam oriented towards RIS 50, control circuitry 14 may configure (e.g., program) a phased antenna array of antennas 30 on UE device 10 to form a UE beam oriented towards RIS 50, control circuitry 52 may configure (e.g., program) antenna elements 48 to receive and re-radiate (e.g., effectively reflect) wireless signals incident from the direction of BS 34 towards/onto the direction of UE device 10 (as shown by arrow 54), and control circuitry 52 may configure (e.g., program) antenna elements 48 to receive and re-radiate (e.g., effectively reflect) wireless signals incident from the direction of UE device 10 towards-onto the direction of BS 34 (as shown by arrow 56). The antenna elements may be configured using respective beamforming coefficients. Control circuitry 52 on RIS 50 may set and adjust the adjustable devices coupled to antenna elements 48 (e.g., may set and adjust the impedances of antenna elements 48) over time to reflect wireless signals 46 incident from different selected incident angles onto different selected output angles.

To minimize the cost, complexity, and power consumption of RIS 50, RIS 50 may include only the components and control circuitry required to control and operate antenna elements 48 to reflect wireless signals 46. Such components and control circuitry may include, for example, the adjustable devices of antenna elements 48 as required to change the phase and magnitude responses of antenna elements 48 (based on corresponding beamforming coefficients) and thus the direction with which RIS 50 reflects wireless signals 46. The components may include, for example, components that adjust the impedances of antenna elements 48 so that each antenna element exhibits a respective complex reflection coefficient, which determines the phase and amplitude of the reflected (re-radiated) signal produced by each antenna element (e.g., such that the signals reflected across the array constructively and destructively interfere to form a reflected signal beam in a corresponding beam pointing direction).

All other components that would otherwise be present in UE device 10 or BS 34 may be omitted from RIS 50. For example, RIS 50 does not include baseband circuitry (e.g., baseband circuitry 26 or 40) and does not include transceiver circuitry (e.g., transceiver 42 or 28) coupled to antenna elements 48. Antenna elements 48 and RIS 50 therefore do not generate wireless data for transmission, do not synthesize radio-frequency signals for transmission, and do not receive and demodulate radio-frequency signals. RIS 50 may also be implemented without a display or user input device. In other words, the control circuitry on RIS 50 may adjust antenna elements 48 to direct and steer reflected wireless signals 46 without using antenna elements 48 to perform any data transmission or reception operations and without using antenna elements 48 to perform radio-frequency sensing operations. In other implementations, the RIS may include some active circuitry such as circuitry for demodulating received signals using the data RAT (e.g., to perform channel estimates for optimizing its reflection coefficients).

This may serve to minimize the hardware cost and power consumption of RIS 50. If desired, RIS 50 may also include one or more antennas (e.g., antennas separate from the antenna elements 48 used to reflect wireless signals 46) and corresponding transceiver/baseband circuitry that uses the one or more antennas to convey control signals with BS 34 or UE device 10 (e.g., using a control channel plane and control RAT). Such control signals may be used to coordinate the operation of RIS 50 in conjunction with BS 34 and/or UE device 10 but requires much lower data rates and thus much fewer processing resources and much less power than transmitting or receiving wireless signals 46. These control signals may, for example, be transmitted by UE device 10 and/or BS 34 to configure the phase and magnitude responses of antenna elements 48 (e.g., the control signals may convey beamforming coefficients). This may allow the calculation of phase and magnitude responses for antenna elements 48 to be offloaded from RIS 50, further reducing the processing resources and power required by RIS 50. In other implementations, RIS 50 may be a self-controlled RIS that includes processing circuitry for generating its own phase and magnitude responses and/or for coordinating communications among multiple UE devices (e.g., in an RIS-as-a-service configuration).

In this way, RIS 50 may help to relay wireless signals 46 between BS 34 and UE device 10 when object 31 blocks the LOS path between BS 34 and UE device 10 and/or when the propagation conditions from BS 34 to RIS 50 and from RIS 50 to UE device 10 are otherwise superior to the propagation conditions from BS 34 to UE device 10. Just a single RIS 50 may, for example, increase signal-to-interference-plus-noise ratio (SINR) for UE device 10 by as much as +20 dB and may increase effective channel rank relative to environments without an RIS. At the same time, RIS 50 only includes processing resources and consumes power required to perform control procedures, minimizing the cost of RIS 50 and maximizing the flexibility with which RIS 50 can be placed within the environment.

RIS 50 may include or store a codebook (sometimes referred to herein as a RIS codebook) that maps settings for antenna elements 48 to different reflected signal beams formable by antenna elements 48 (sometimes referred to herein as RIS beams). RIS 50 may configure its own antenna elements 48 to perform beamforming with respective beamforming coefficients (e.g., as given by the RIS codebook). The beamforming performed at RIS 50 may include two concurrently active RIS beams (e.g., where each RIS beam is generated using a corresponding set of beamforming coefficients).

In general, RIS 50 may relay (reflect) signals between two different devices. RIS 50 may form a first active RIS beam that has a beam pointing direction oriented towards the first device (sometimes referred to here as a RIS-BS beam when the first device is BS 34) and may concurrently form a second active RIS beam that has a beam pointing direction oriented towards the second device (sometimes referred to herein as a RIS-UE beam when the second device is UE device 10). In this way, when wireless signals 46 are incident from the first device (e.g., BS 34) within the first RIS beam, the antenna elements 48 on RIS 50 may receive the wireless signals incident from the direction the first device (e.g., BS 34) and may re-radiate (e.g., effectively reflect) the incident wireless signals within the second RIS beam and towards the direction of the second device (e.g., UE device 10). Conversely, when wireless signals 46 are incident from the second device (e.g., UE device 10) within the second RIS beam, the antenna elements 48 on RIS 50 may receive the wireless signals incident from the direction the second device (e.g., UE device 10) and may re-radiate (e.g., effectively reflect) the incident wireless signals within the first RIS beam and towards the direction of the first device (e.g., BS 34). In some implementations, RIS 50 may be a transmissive RIS that redirects (e.g., refracts) incident data RAT signals through the plane of the RIS (e.g., according to the impedances of the antenna elements of the RIS) rather than reflecting the signals. RIS's 50 in these configurations may sometimes be referred to herein as transmissive RIS's (e.g., a transmissive RIS may be deployed on a window to refract signals into and/or out of a room through the window).

While referred to herein as "beams," the RIS beams formed by RIS 50 do not include signals/data that are actively transmitted by RIS 50 but instead correspond to the impedance, phase, and/or magnitude response settings (e.g., reflection coefficients) for antenna elements 48 that shape the reflected signal beam of wireless signals 46 from a corresponding incident direction/angle onto a corresponding output direction/angle (e.g., one RIS beam may be effectively formed using a first set of beamforming coefficients whereas another RIS beam may be effectively formed using a second set of beamforming coefficients).

Figure 2:
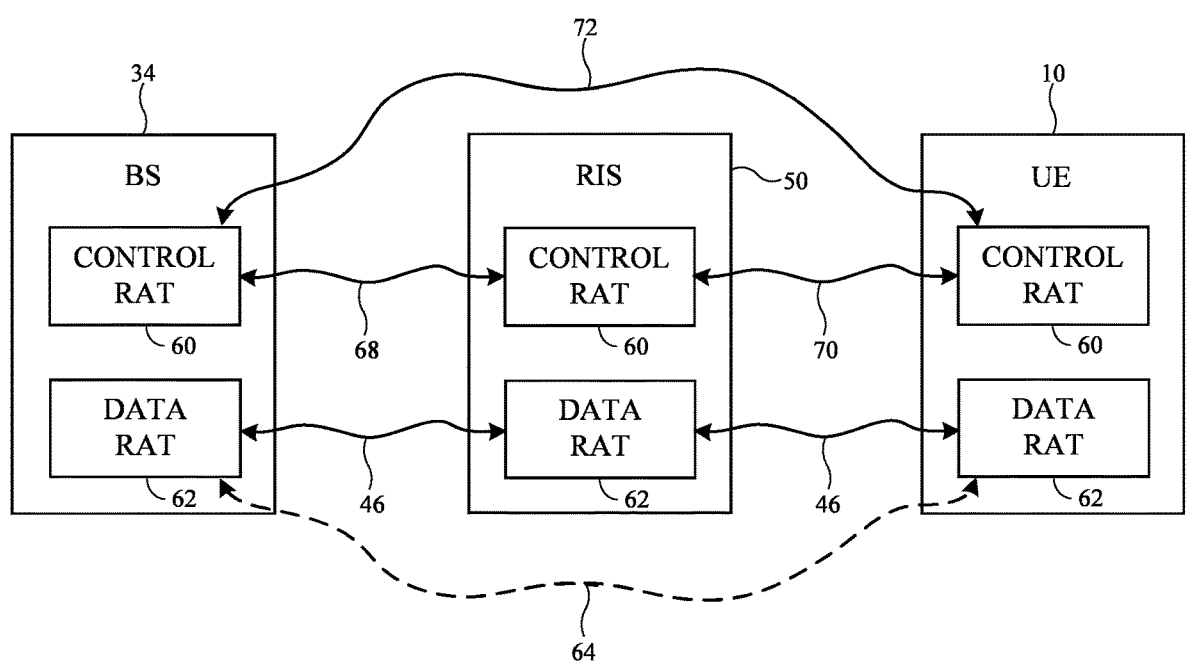
FIG. 2 is a diagram showing how an illustrative wireless base station, RIS, and UE device may communicate using both a data transfer radio access technology (RAT) and a control RAT in accordance with some embodiments.

FIG. 2 is a diagram showing how BS 34, RIS 50, and UE device 10 may communicate using both a control RAT and a data transfer RAT for establishing and maintaining communications between BS 34 and UE device 10 via RIS 50. As shown in FIG. 2, BS 34, RIS 50, and UE device 10 may each include wireless circuitry that operates according to a data transfer RAT 62 (sometimes referred to herein as data RAT 62) and a control RAT 60. Data RAT 62 may be a sub-THz communications RAT such as a 6G RAT that performs wireless communications at the frequencies of wireless signals 46. Control RAT 60 may be associated with wireless communications that consume much fewer resources and are less expensive to implement than the communications of data RAT 62. For example, control RAT 60 may be Wi-Fi, Bluetooth, a cellular telephone RAT such as a 3G, 4G, or 5G NR FR1 RAT, etc. As another example control RAT 60 may be an infrared communications RAT (e.g., where an infrared remote control or infrared emitters and sensors use infrared light to convey signals for the control RAT between UE device 10, BS 34, and/or RIS 50).

BS 34 and RIS 50 may use control RAT 60 to convey radio-frequency signals 68 (e.g., control signals) between BS 34 and RIS 50. UE device 10 and RIS 50 may use control RAT 60 to convey radio-frequency signals 70 (e.g., control signals) between UE device 10 and RIS 50. UE device 10, BS 34, and RIS 50 may use data RAT 62 to convey wireless signals 46 via reflection off antenna elements 48 of RIS 50. The wireless signals may be reflected, via the first RIS beam and the second RIS beam formed by RIS 50, between BS 34 and UE device 10. BS 34 may use radio-frequency signals 68 and control RAT 116 and/or UE device 10 may use radio-frequency signals 70 and control RAT 116 to discover RIS 50 and to configure antenna elements 48 to establish and maintain the relay of wireless signals 46 performed by antenna elements 48 using data RAT 62.

If desired, BS 34 and UE device 10 may also use control RAT 60 to convey radio-frequency signals 72 directly with each other (e.g., since the control RAT operates at lower frequencies that do not require line-of-sight). UE device 10 and BS 34 may use radio-frequency signals 72 to help establish and maintain THF communications (communications using data RAT 62) between UE device 10 and BS 34 via RIS 50. BS 34 and UE device 10 may also use data RAT 62 to convey wireless signals 46 directly (e.g., without reflection off RIS 50) when a LOS path is available.

If desired, the same control RAT 60 may be used to convey radio-frequency signals 68 between BS 34 and RIS 50 and to convey radio-frequency signals 70 between RIS 50 and UE device 10. If desired, BS 34, RIS 50, and/or UE device 10 may support multiple control RATs 60. In these scenarios, a first control RAT 60 (e.g., Bluetooth) may be used to convey radio-frequency signals 68 between BS 34 and RIS 50, a second control RAT 60 (e.g., Wi-Fi) may be used to convey radio-frequency signals 70 between RIS 50 and UE device 10, and/or a third control RAT 60 may be used to convey radio-frequency signals 72 between BS 34 and UE device 10. Processing procedures (e.g., work responsibilities) may be divided between data RAT 62 one or more control RAT 60 during discovery, initial configuration, data RAT communication between UE device 10 and BS 34 via RIS 50, and beam tracking of UE device 10.

Figure 3:
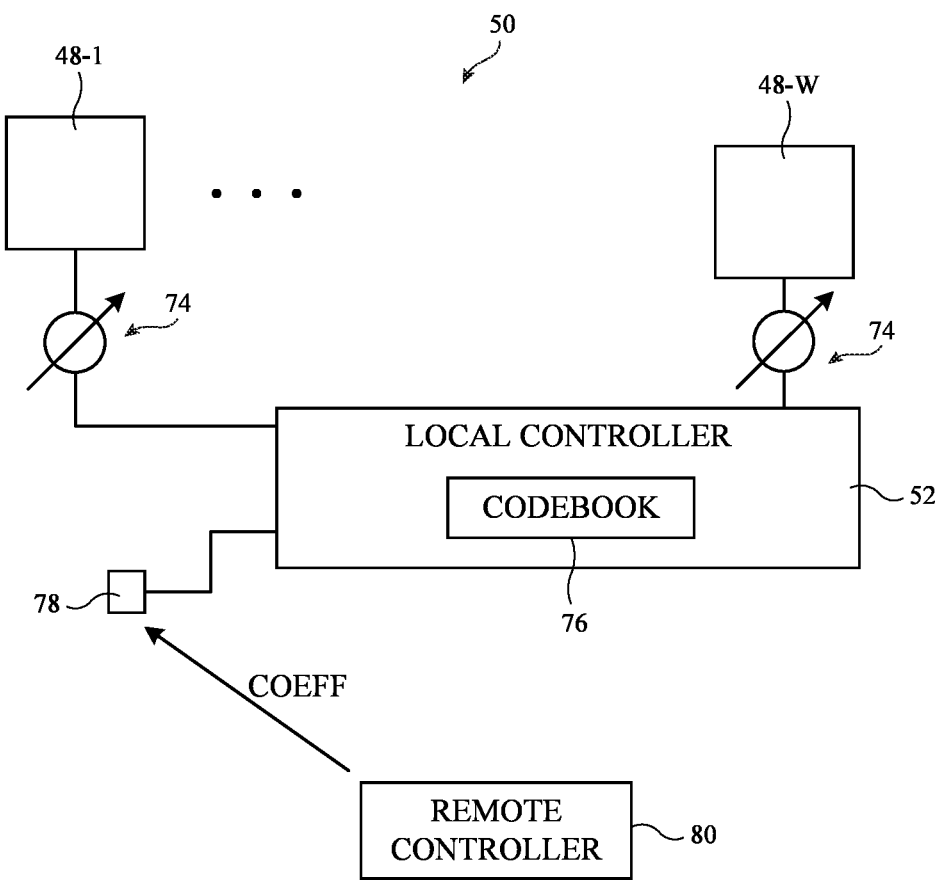
FIG. 3 is a diagram of an illustrative RIS in accordance with some embodiments.

FIG. 3 is a diagram of RIS 50. As shown in FIG. 3, RIS 50 may include a set of W antenna elements 48 (e.g., patches or other structures formed from metal or metamaterials on an underlying substrate). The W antenna elements 48 may be arranged in an array pattern (e.g., having sub-wavelength spacing). The array pattern may have rows and columns. Other array patterns may be used if desired. Each antenna element W may be coupled to a corresponding adjustable device 74. Adjustable devices 74 may include, as one example, a diode switch. Each adjustable device 74 and its corresponding antenna element 48 may sometimes be referred to herein as a unit cell of RIS 50 (e.g., RIS 50 may have W unit cells).

Control circuitry 52 may provide control signals (e.g., a variable voltage) to adjustable devices 74 that configure each adjustable device 74 to impart a selected impedance to its corresponding antenna element 48. The impedance may effectively impart a corresponding phase shift to incident THF signals that are scattered (e.g., re-radiated or effectively reflected) by the antenna element. Adjustable devices 74 may therefore sometimes be referred to herein as phase shifters 74. Control circuitry 52 may transmit control signals to phase shifters 74 to control each phase shifter 74 to exhibit a corresponding phase setting and thus a corresponding reflection coefficient. Each phase setting may cause the antenna element 48 to impart a corresponding phase shift to the wireless signals 46 scattered (reflected) by the antenna element for data RAT 62. Put differently, each phase setting may configure the corresponding antenna element 48 to exhibit a particular reflection coefficient or impedance for incident signals. By selecting the appropriate settings (phase shift settings or applied phase shifts) for phase shifters 74, the array of antenna elements 48 may be configured to form RIS beams in different directions (e.g., to reflect/scatter wireless signals incident from incident angles associated with a first RIS beam onto corresponding output angles associated with a second RIS beam).

As shown in FIG. 3, RIS 50 may have one or more antennas 78. Antenna(s) 78 may include one or more of the W antenna elements 48 or may be separate from the W antenna elements 48 on RIS 50. Antenna(s) 78 may be coupled to a transceiver on RIS 50 and may be used to convey control signals over control RAT 60. Control circuitry 52 may transmit control signals using antenna(s) 78 and/or may receive control signals using antenna(s) 78.

Control circuitry 52 may store a codebook 76 that maps different sets of settings (e.g., phase settings) for phase shifters 74 to different input/output angles (e.g., to different combinations of first and second RIS beams for RIS 50). Codebook 76 may be populated during manufacture, deployment, calibration, and/or regular operation of RIS 50. If desired, BS 34, UE device 10, or a dedicated controller may use control RAT 60 to populate and/or update the entries of codebook 76. During operation, RIS 50 may be controlled to configure (program) phase shifters 74 to form the RIS beams necessary for RIS 50 to reflect wireless signals 46 between the location of BS 34 and the location of UE device 10, which may change over time. This may involve selection (calculation) of the appropriate set of phase settings (e.g., imparted phase shifts or reflection coefficients) for phase shifters 74 to form the RIS beams.

RIS 50 may dynamically change the phase settings (reflection coefficients) of antenna elements 48 over time (e.g., to direct reflected signals in different directions to serve one or more UE devices 10). If desired, RIS 50 may be at least partially controlled by a remote controller 80 located on an external device other than RIS 50. Remote controller 80 may be located on an electronic device such as a BS 34, a UE device 10 (sometimes referred to herein as a controller UE device), a dedicated RIS controller, and/or other nodes of system 8. Remote controller 80 may be distributed across multiple devices or network nodes if desired. UE devices that convey data RAT signals with BS 34 via reflection off RIS 50 may sometimes be referred to herein as served UE devices. A served UE device may be different from a controller UE device or may also be a controller UE device if desired.

Control circuitry 52 is located on RIS 50 and is not remote from RIS 50. Control circuitry 52 may therefore sometimes be referred to herein as local controller 52. Local controller 52 may include one or more processors located on RIS 50, which may sometimes be referred to herein as one or more local processors, one or more RIS processors, or a first set of one or more processors on RIS 50. Remote controller 80 may also include one or more processors (e.g., one or more processors that are not located on RIS 50), which may sometimes be referred to herein as one or more remote processors or a second set of one or more processors remote to RIS 50. In implementations where system 8 includes more than one RIS, each RIS may include its own local controller 52.

Remote controller 80 may help to control how local controller 52 programs (configures) phase shifters 74 for reflecting data RAT signals in different desired directions. In some implementations, remote controller 80 may generate (e.g., compute, calculate, output, produce, etc.) the reflection coefficients COEFF for the antenna elements 48 on RIS 50, thereby reducing the processing resources required at local controller 52. While referred to herein as reflection coefficients COEFF, reflection coefficients COEFF may equivalently include a set of phase settings/shifts for the phase shifters 74 on RIS 50 to use in impart the corresponding antenna elements 48 with the reflection coefficients required to form a particular RIS beam in a corresponding beam pointing direction. Remote controller 80 may transmit reflection coefficients COEFF to RIS 50 (e.g., using the control RAT and antenna 78 on RIS 50). Local controller 52 may then configure phase shifters 74 to provide the corresponding antenna elements 48 with reflection coefficients COEFF. Once configured using reflection coefficients COEFF, RIS 50 may reflect data RAT signals between one or more base stations 34 and one or more UE devices 10.

However, completely delegating phase shift (reflection coefficient) selection to remote controller 80 in this way has several drawbacks. First, such delegation can impose excessive communication overhead on system 8. For example, every time remote controller 80 decides to change the configuration of RIS 50 (e.g., to update the orientation of the RIS beam by changing the phase settings/reflection coefficients of phase shifters 74), remote controller 80 needs to transmit the corresponding coefficients to local controller 52. In addition, for mobile situations, the channel conditions can vary rapidly over time, thereby requiring frequent RIS reconfiguration to maintain a data RAT link to the served UE device. Second, the RIS may not be configurable when the served UE device is outside of the control RAT coverage area of remote controller 80, as the served UE device will be unable to provide channel measurements and/or positioning information to the remote controller. Third, if the RIS configuration is generated based on positioning information, a served UE device may need to share its positioning information with a remote controller 80 in a way that undesirably exposes private information of the served UE device with the party associated with remote controller 80.

To mitigate these issues while allowing RIS 50 to be quickly and efficiently configured for reflecting data RAT signals with minimal overhead, control of the antenna elements 48 on RIS 50 may be split between remote controller 80, local controller 52, and the served UE device 10. The control splitting schemes described herein may be performed after an initial synchronization/connection procedure is performed between the RIS and local controller, the remote controller and the local controller, and the local controller and the served UE device 10, for example. During the initial synchronization, remote controller 80 may receive or identify static information about RIS 50 such as information identifying the type or capabilities of RIS 50, the number and geometry of antenna elements 48, a set of permitted phase shift values (precision) for antenna elements 48, a set of supported phase shift configurations, and/or implementation limitations or impairments of RIS 50, as examples.

Figure 4:
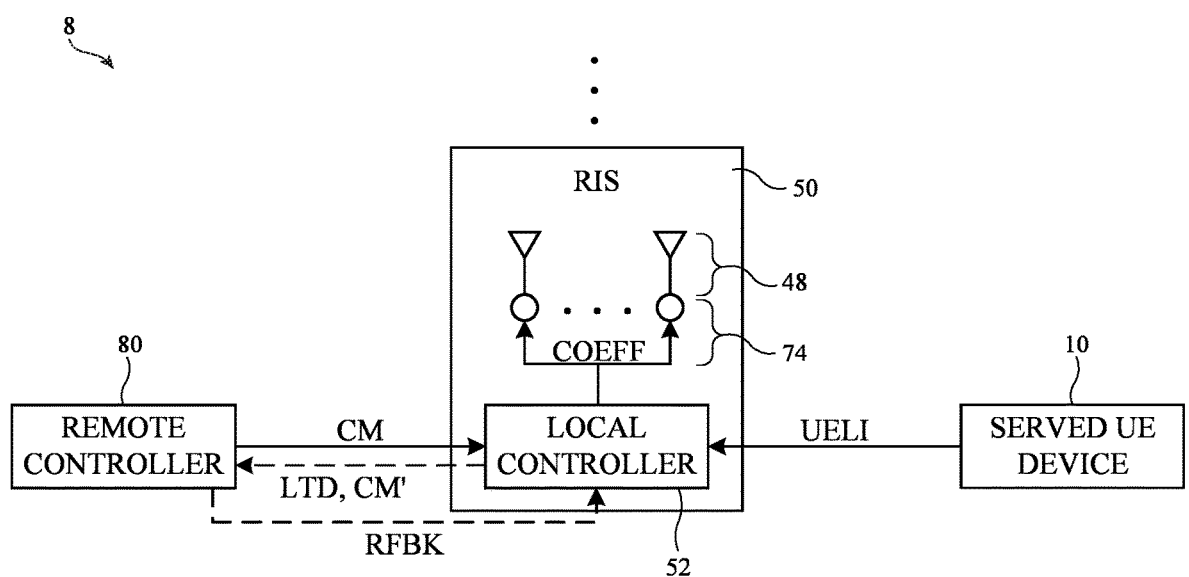
FIG. 4 is a diagram showing how an illustrative RIS may generate its own reflection coefficients based on a control model received from a remote controller and local information received from a UE device in accordance with some embodiments.

FIG. 4 is a diagram showing a first example of how control of RIS 50 may be split between remote controller 80, local controller 52, and a served UE device 10. In this example, additional information need not be conveyed via the control RAT between remote controller 80 and the served UE device 10.

As shown in FIG. 4, remote controller 80 may transmit a control model CM to local controller 52 on RIS 50 using the control RAT. The served UE device 10 may transmit UE local information UELI to local controller 52 using the control RAT. If desired, remote controller 80 and served UE device 10 may communicate with local controller 52 using different control RATs.

Local controller 52 may generate reflection coefficients COEFF based on the control model CM received from remote controller 80 and the UE local information UELI received from the served UE device 10. Local controller 52 may program or configure phase shifters 74 using the generated reflection coefficients COEFF. For example, local controller 52 may apply phase shift settings to phase shifters 74 that configure phase shifters 74 to exhibit a set of impedances (e.g., to impart reflected signals from antenna elements 48 with corresponding phase shifts) that configure the corresponding antenna elements 48 to exhibit the generated reflection coefficients COEFF. RIS 50 may then reflect data RAT signals between served UE device 10 and BS 34 (FIG. 1).

If desired, an additional (optional) interface may be provided between remote controller 80 and local controller 52 to support an artificial intelligence (AI) or machine learning (ML) model used by remote controller 80 to generate control model CM. Local controller 52 may use the control RAT to transmit information to remote controller 80 for use in training the AI/ML model used by remote controller 80. For example, local controller 52 may transmit local training data LTD to remote controller 80 using the control RAT. Local training data LTD may be generated based on UE local information UELI and/or RIS local information generated at local controller 52. Remote controller 80 may generate or update control model CM based on local training data LTD.

Additionally or alternatively, an additional (optional) interface may be provided between remote controller 80 and local controller 52 to support federated learning (FL) training (e.g., between multiple RIS's 50 and/or served UE devices 10 in system 8). For example, local controller 52 may update its received control model CM based on UE local information UELI and/or RIS local information generated at local controller 52, producing an updated control model CM'. Local controller 52 may transmit updated control model CM' to remote controller 80 using the control RAT. Remote controller 80 may aggregate the updated control model CM' from RIS 50 with updated control models received from other RIS's 50 and/or served UE devices 10 in system 8 to update the control model CM provided to each RIS using an FL scheme.

Additionally or alternatively, an additional (optional) interface may be provided between remote controller 80 and local controller 52 to support reinforcement learning-based optimization (e.g., across multiple RIS's 50 and/or served UE devices 10 in system 8). For example, remote controller 80 may generate global reward feedback RFBK. Reward feedback RFBK may, for example, carry an estimate of the quality of the currently applied control model CM at all local controllers 52 in the RIS's 50 and/or control models at served UE devices 10 of system 8. Remote controller 80 may transmit reward feedback RFBK to local controller 52 using the control RAT. Local controller 52 may update its received control model CM based on reward feedback RFBK, UE local information UELI, and/or RIS local information. Local controller 52 may then transmit its local RIS configuration back to remote controller 80 using the control RAT. Remote controller 80 may then estimate the aggregate reward of the joint configurations of all the RIS's and/or served UE devices 10 in system 8 and may transmit the aggregate reward to the local controllers 52 and/or served UE devices 10 in system 8.

Figure 5:
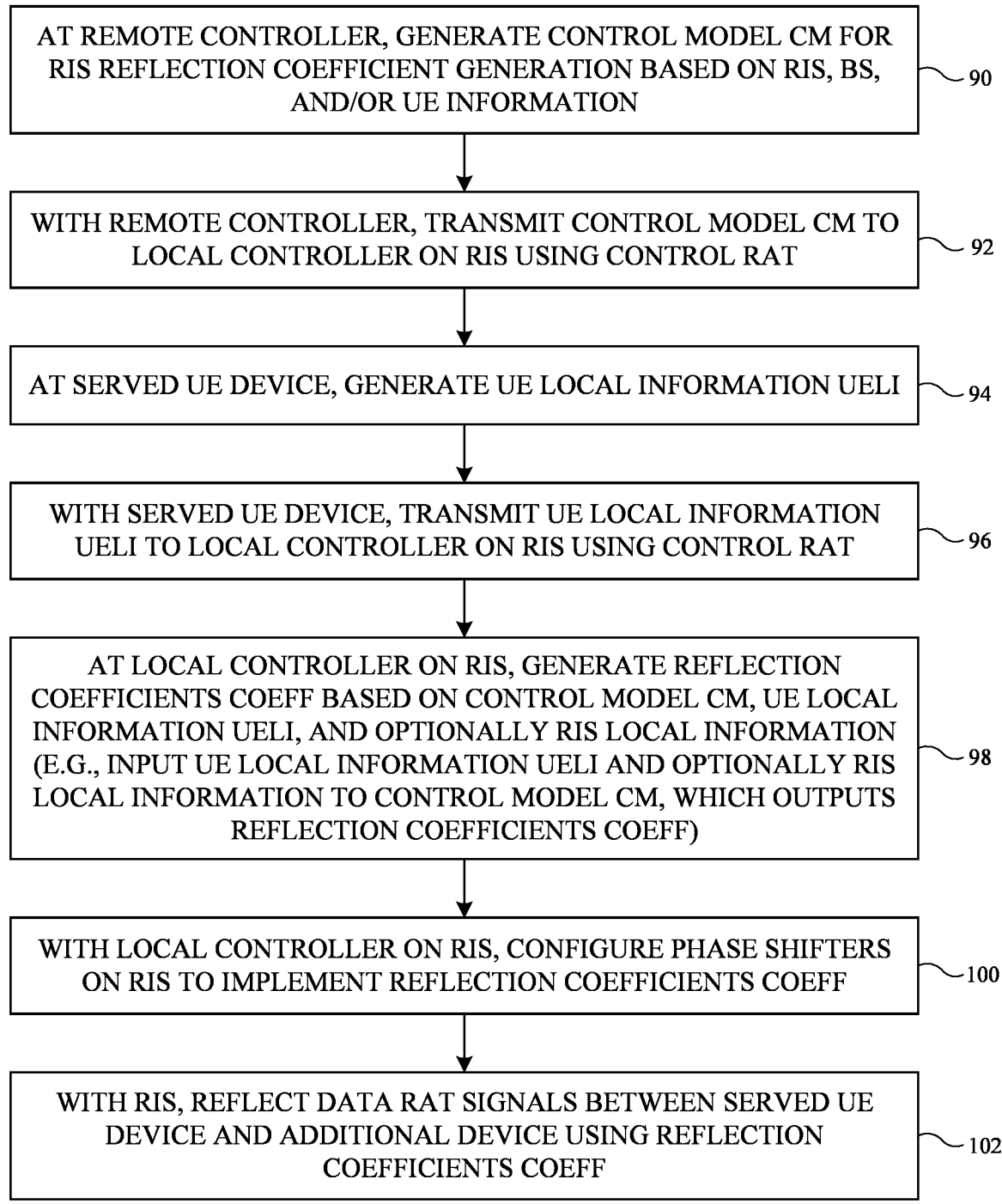
FIG. 5 is a flow chart of illustrative operations involved in performing wireless communications using a RIS that generates its own reflection coefficients based on a control model received from a remote controller and local information received from a UE device in accordance with some embodiments.

FIG. 5 is a flow chart of illustrative operations involved in performing wireless communications between served UE device 10 and BS 34 using the RIS 50 of FIG. 4 (e.g., a RIS 50 that generates its own reflection coefficients COEFF based on a control model CM received from remote controller 80 and UE local information UELI received from served UE device 10). In the example of FIG. 5, the optional communications interfaces of FIG. 4 for supporting ML/AI training, FL training, and reinforcement learning-based optimization have been omitted for the sake of clarity. The operations of FIG. 5 may be performed after an initial synchronization/connection procedure between remote controller 80 and RIS 50 and between RIS 50 and the served UE device 10 (e.g., such that remote controller 80 is known to local controller 52, local controller 52 is known to remote controller 80, local controller 52 is known to served UE device 10, and served UE device 10 is known to local controller 52).

At operation 90 of FIG. 5, remote controller 80 may generate control model CM for generating RIS reflection coefficients based on information about RIS 50, BS 34, and/or served UE device 10. Control model CM may be an AI/ML model, mathematical formula, function, or algorithm that takes local information from one or more of these devices as its input and that outputs reflection coefficients COEFF for RIS 50 to use in forming a corresponding RIS beam. The local information may include local information about RIS 50 (e.g., as generated at RIS 50), local information about served UE device 10 (e.g., as generated at served UE device 10), and/or local information about BS 34 (e.g., as generated at BS 34). The local information may be periodically transmitted to remote controller 80 over the control RAT or other communications links.

Remote controller 80 may periodically generate (e.g., produce, output, compute, calculate, etc.) control model CM based on channel state information between BS 34 and RIS 50 (sometimes referred to herein as BS-RIS channel state information), channel statistics between BS 34 and RIS 50, channel statistics of a cascaded channel, channel statistics between RIS 50 and one or more served UE devices 10, statistics of UE device distribution and/or traffic within system 8, scheduling decisions made by BS 34, the position of RIS 50, the position of BS 34 and/or other base stations in system 8, sensing-based information gathered by or about RIS 50, training data derived from the local information, and/or locally trained models (e.g., AI/ML models or FL models).

At operation 92, remote controller 80 may transmit control model CM to local controller 52 on RIS 50 using the control RAT.

At operation 94, served UE device 10 may generate local information such as UE local information UELI. UE local information UELI may include information about the position and/or orientation of served UE device 10 relative to RIS 50 and/or BS 34, information about a current synchronization signal block (SSB) beam of served UE device 10 (e.g., for receiving SSBs from the network), channel state information between served UE device 10 and RIS 50 (sometimes referred to herein as UE-RIS channel state information), and/or a configuration identifier identifying some or all of this information, as examples.

At operation 96, served UE device 10 may transmit UE local information UELI to local controller 52 on RIS 50 using the control RAT. UE device 10 may periodically transmit UE local information UELI to local controller 52 (e.g., at a periodicity that is less than the periodicity with which remote controller 80 transmits control model CM to local controller 52). Operations 94 and 96 may be performed prior to or concurrently with operations 90 and/or 92 if desired.

At operation 98, local controller 52 on RIS 50 may generate reflection coefficients COEFF based on control model CM, UE local information UELI, and optionally RIS local information. The RIS local information (sometimes referred to herein as RIS local information RLI) may include information identifying which antenna elements 48 are active (switched on or enabled) or inactive (switched off or disabled), information about the position and/or orientation of RIS 50, calibration information, and/or information about supported RIS configurations (e.g., settings for antenna elements 48), as examples. Local controller 52 may, for example, input UE local information UELI and optionally the RIS local information RLI to control model CM, which outputs reflection coefficients COEFF. Reflection coefficients COEFF may, for example, be reflection coefficients that antenna elements 48 need to exhibit in order to reflect data RAT signals between the location of BS 34 and the location of served UE device 10 (e.g., as identified in UE local information UELI) given the current channel statistics, channel state information, training information, and other information incorporated into control model CM.

At operation 100, local controller 52 may configure phase shifters 74 on RIS 50 to implement reflection coefficients COEFF. For example, local controller 52 may configure (program) phase shifters 74 to exhibit a set of desired impedances (e.g., to produce a corresponding set of phase shifts to reflected signals) that configure the corresponding antenna elements 48 to implement reflection coefficients COEFF.

As just one example for the sake of illustration, the reflection coefficient $COEFF_k$ for the $k^{th}$ antenna element 48 on RIS 50 may be defined by the formula $COEFF_k = (2\pi/\lambda)\|p_{UE}-p_k\|-\varphi_k$, where $\lambda$ is the wavelength of the data RAT signals to be reflected, $\varphi_k$ is the phase of the transmitter-to-RIS channel at the $k^{th}$ antenna element 48, $p_{UE}$ is the three-dimensional position of the served UE device 10, and $p_k$ is the three-dimensional position of the $k^{th}$ antenna element 48. In this example, local controller 52 may receive UE local information $UELI = p_{UE}$ (at operation 96), remote controller 80 may estimate $\{p_k, \varphi_k\}$ and $\lambda$ and may transmit the control model $CM = p_{UE} \rightarrow \{(2\pi/\lambda)\|p_{UE}-p_k\|-\varphi_k\}$ to local controller 52 (at operations 90 and 92), and local controller 52 may compute $p_{UE} \rightarrow \{(2\pi/\lambda)\|p_{UE}-p_k\|-\varphi_k\}$ to generate reflection coefficients $COEFF_k$ (at operation 98) that are then applied to antenna elements 48 (at operation 100). This example is illustrative and, in general, any desired algorithms may be used to generate reflection coefficients COEFF and control model CM may contain any desired models or functions.

At operation 102, antenna elements 48 on RIS 50 may reflect data RAT signals between an additional device such as BS 34 (FIGS. 1 and 2) and served UE device 10 while configured to implement reflection coefficients COEFF. Put differently, reflection coefficients COEFF may configure antenna elements 48 to form RIS beams oriented towards BS 34 and served UE device 10 and the RIS beams may be used to reflect data RAT signals between served UE device 10 and BS 34.

Figure 6:
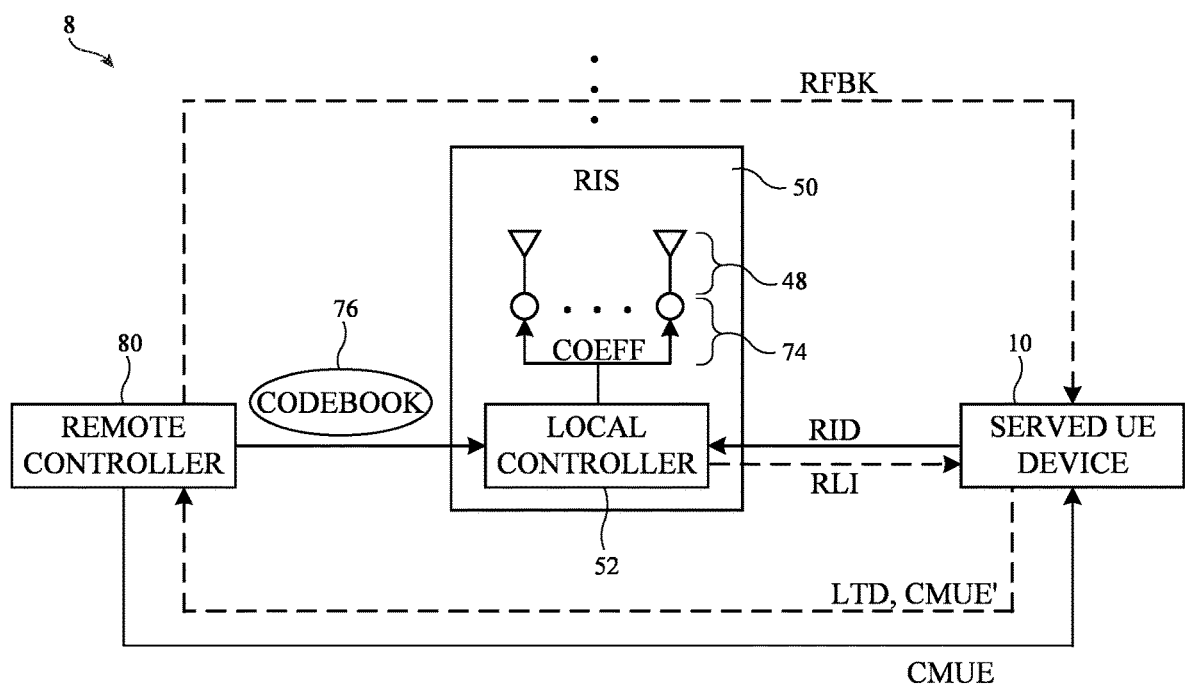
FIG. 6 is a diagram showing how an illustrative RIS may generate its own reflection coefficients based on a codebook received from a remote controller and a RIS configuration identifier received from a UE device in accordance with some embodiments.

In the examples of FIGS. 4 and 5, RIS 50 receives control model CM from remote controller 80 for generating reflection coefficients COEFF. If desired, some of the processing load in generating reflection coefficients COEFF may be offloaded to served UE device 10, thereby further reducing the resources required at RIS 50. FIG. 6 is a diagram showing a second example of how control of RIS 50 may be split between remote controller 80, local controller 52, and a served UE device 10. In this example, additional information is conveyed via the control RAT between remote controller 80 and the served UE device 10 to offload some of the processing of reflection coefficients COEFF onto served UE device 10.

As shown in FIG. 6, remote controller 80 may transmit a control model for served UE device 10 (sometimes referred to herein as UE control model CMUE) to served UE device 10 using the control RAT. Served UE device 10 may generate UE local information UELI but need not transmit the UE local information to other devices. Remote controller 80 may generate the codebook 76 of phase shift settings for RIS 50. This may serve to further reduce the processing resources and power required at RIS 50. Remote controller 80 may transmit codebook 76 to local controller 52 on RIS 50 using the control RAT.

If desired, local controller 52 may optionally generate RIS local information RLI. Local controller 52 may transmit RIS local information RLI to served UE device 10 using the control RAT. Served UE device 10 may generate a RIS configuration identifier RID based on the UE control model CMUE received from remote controller 80, UE local information UELI, and optionally RIS local information RLI received from local controller 52. For example, served UE device 10 may input UE local information UELI and optionally RIS local information RLI to UE control model CMUE, which outputs RIS configuration identifier RID. RIS configuration identifier RID may identify an entry of codebook 76 (e.g., reflection coefficients COEFF, or equivalently a set of phase shifts to be applied by phase shifters 74, a set of impedances to be produced by phase shifters 74, settings for phase shifters 74, control signals to provide to phase shifters 74 to program phase shifters 74, a particular RIS beam of RIS 50, a configuration for antenna elements 48, or a configuration for RIS 50) for RIS 50 to use in configuring antenna elements 48 for reflecting data RAT signals. Served UE device 10 may transmit RIS configuration identifier RID to local controller 52 on RIS 50 using the control RAT. If desired, remote controller 80 and served UE device 10 may communicate with local controller 52 using different control RATs.

If desired, an additional (optional) interface may be provided between remote controller 80 and served UE device 10 to support an artificial intelligence (AI) or machine learning (ML) model used by remote controller 80 to generate UE control model CMUE. Served UE device 10 may use the control RAT to transmit information to remote controller 80 for use in training the AI/ML model used by remote controller 80. For example, served UE device 10 may transmit local training data LTD to remote controller 80 using the control RAT. Local training data LTD may be generated based on UE local information UELI and/or RIS local information RLI. Remote controller 80 may generate or update UE control model CMUE based on local training data LTD.

Additionally or alternatively, an additional (optional) interface may be provided between remote controller 80 and served UE device 10 to support federated learning (FL) training (e.g., between multiple served UE devices and/or RIS's in system 8). For example, served UE device 10 may update its received UE control model CMUE based on UE local information UELI and/or RIS local information RLI, producing an updated UE control model CMUE'. Served UE device 10 may transmit updated UE control model CMUE' to remote controller 80 using the control RAT. Remote controller 80 may aggregate the updated UE control model CMUE' from served UE device 10 with updated control models received from other served UE devices and/or RIS's in system 8 to update the UE control model CMUE provided to each served UE device and/or the control model CM provided to each RIS 50 using an FL scheme.

Additionally or alternatively, an additional (optional) interface may be provided between remote controller 80 and served UE device 10 to support reinforcement learning-based optimization (e.g., across served UE devices 10 and/or multiple RIS's 50 in system 8). For example, remote controller 80 may generate global reward feedback RFBK. Reward feedback RFBK may, for example, carry an estimate of the quality of the currently applied UE control model CMUE at all served UE devices 10 and/or the currently applied control model CM at all local controllers 52 in the RIS's 50 of system 8. Remote controller 80 may transmit reward feedback RFBK to served UE device 10 using the control RAT. Served UE device 10 may update its received UE control model CMUE based on reward feedback RFBK, UE local information UELI, and/or RIS local information RLI. Served UE device 10 may then transmit its local UE configuration back to remote controller 80 using the control RAT. Remote controller 80 may then estimate the aggregate reward of the joint configurations of all the served UE devices 10 and/or all the RIS's 50 in system 8 and may transmit the aggregate reward to the served UE devices 10 and/or the RIS's 50 in system 8.

Figure 7:
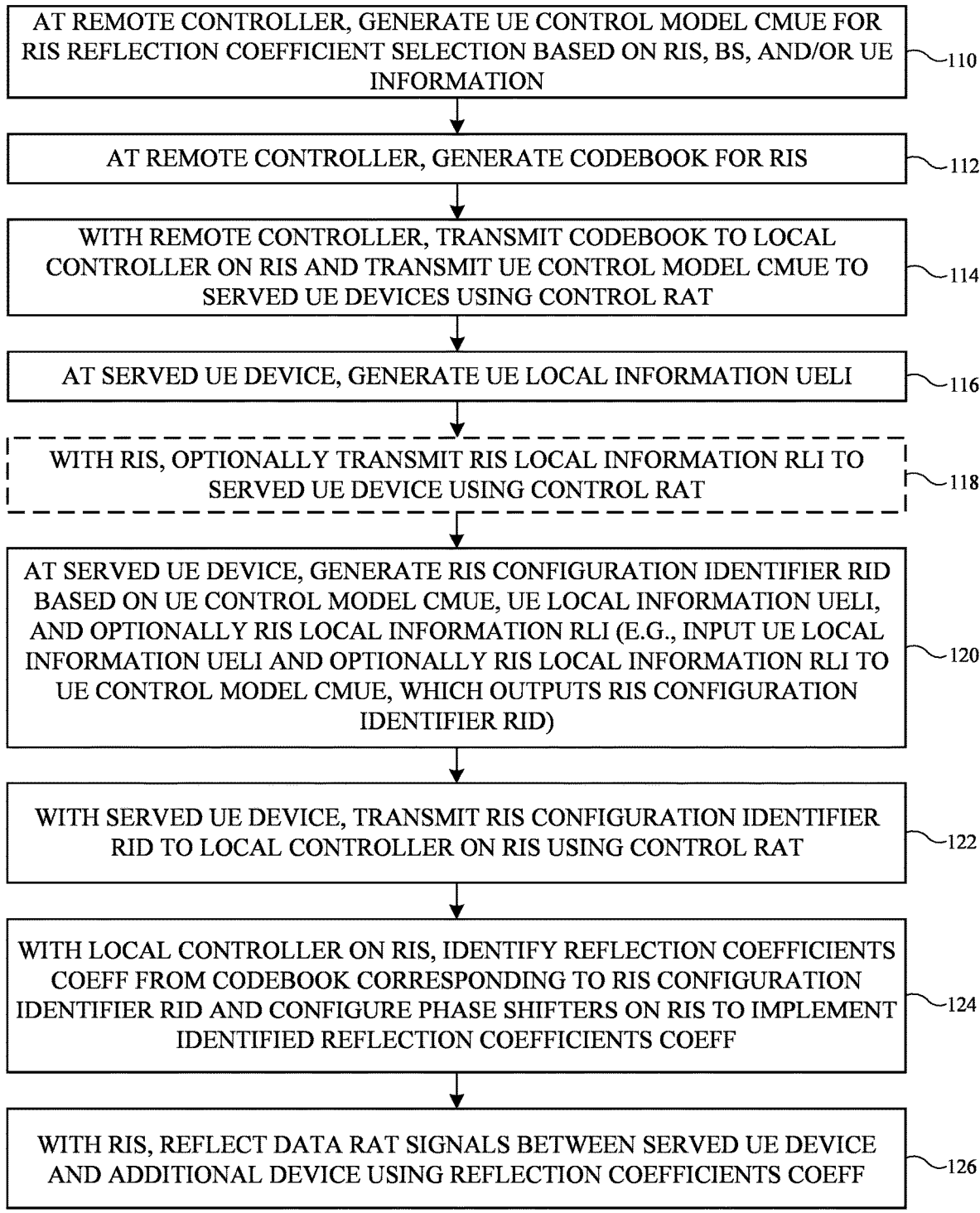
FIG. 7 is a flow chart of illustrative operations involved in performing wireless communications using a RIS that generates its own reflection coefficients based on a codebook received from a remote controller and a RIS configuration identifier received from a UE device in accordance with some embodiments.

FIG. 7 is a flow chart of illustrative operations involved in performing wireless communications between served UE device 10 and BS 34 using the RIS 50 of FIG. 6 (e.g., a RIS 50 that programs antenna elements 48 to implement reflection coefficients COEFF based on a codebook 76 received from remote controller 80 and RIS configuration identifier RID received from served UE device 10). In the example of FIG. 7, the optional communications interfaces of FIG. 6 for supporting ML/AI training, FL training, and reinforcement learning-based optimization have been omitted for the sake of clarity. The operations of FIG. 7 may be performed after an initial synchronization/connection procedure between remote controller 80 and RIS 50 and between RIS 50 and the served UE device 10 (e.g., such that remote controller 80 is known to local controller 52, local controller 52 is known to remote controller 80, local controller 52 is known to served UE device 10, and served UE device 10 is known to local controller 52).

At operation 110 of FIG. 7, remote controller 80 may generate UE control model CMUE for generating RIS configuration identifier RID based on information about RIS 50, BS 34, and/or served UE device 10. UE control model CMUE may be an AI/ML model, mathematical formula, function, or algorithm that takes local information from one or more devices as its input and that outputs RIS configuration identifier RID for selecting one or more entries from codebook 76 to implement reflection coefficients COEFF on RIS 50 to form a corresponding RIS beam. The local information may include local information about RIS 50 (e.g., as generated at RIS 50), local information about served UE device 10 (e.g., as generated at served UE device 10), and/or local information about BS 34 (e.g., as generated at BS 34). The local information may be periodically transmitted to remote controller 80 over the control RAT or other communications links.

Remote controller 80 may generate UE control model CMUE based on channel state information between BS 34 and RIS 50 (sometimes referred to herein as BS-RIS channel state information), channel statistics between BS 34 and RIS 50, channel statistics of a cascaded channel, channel statistics between RIS 50 and one or more served UE devices 10, statistics of UE device distribution and/or traffic within system 8, scheduling decisions made by BS 34, the position of RIS 50, the position of BS 34 and/or other base stations in system 8, sensing-based information gathered by or about RIS 50, training data derived from the local information, and/or locally trained models (e.g., AI/ML models or FL models), as examples.

At operation 112, which may be performed concurrently with operation 110, remote controller 80 may generate codebook 76 for RIS 50. Codebook 76 may include an enumerated set of RIS configurations. Each RIS configuration may include a set or reflection coefficients COEFF (e.g., each RIS configuration identified codebook 76 may include a set of phase shifts, impedances, or reflection coefficients to be produced by phase shifters 74, phase settings for phase shifters 74, control settings or signals for phase shifters 74, etc.) for forming a different respective RIS beam. Remote controller 80 may periodically generate (e.g., produce, output, compute, calculate, etc.) a pair of UE control model CMUE and codebook 76

At operation 114, remote controller 80 may transmit codebook 76 to local controller 52 on RIS 50 and may transmit UE control model CMUE to served UE device 10 using the control RAT.

At operation 116, served UE device 116 may generate UE local information UELI. Operation 116 may be performed prior to or concurrently with one or more of operations 110-114.

At optional operation 118, local controller 52 on RIS 50 may generate RIS local information RLI. Local controller 52 may transmit RIS local information RLI to served UE device 10 using the control RAT. Operation 118 may be performed prior to or concurrently with one or more of operations 110-114.

At operation 120, served UE device 10 may generate RIS configuration identifier RID based on UE control model CMUE, UE local information UELI, and optionally RIS local information RLI. For example, served UE device 10 may input UE local information UELI and optionally RIS local information RLI to UE control model CMUE, which outputs RIS configuration identifier RID. RIS configuration identifier RID may identify a particular entry (RIS configuration) from the paired codebook 76 to be implemented by local controller 52 (e.g., to form a corresponding RIS beam for reflecting data RAT signals). If desired, served UE device 10 may receive and store multiple different UE control models CMUE for different RIS's 50 in system 8. In these situations, served UE device 10 may select the UE control model CMUE corresponding to the RIS 50 to be configured prior to generating RIS configuration identifier RID (e.g., after establishing a connection with local controller 52 on RIS 50).

At operation 122, served UE device 10 may transmit RIS configuration identifier RID to local controller 52 on RIS 50 using the control RAT. The period with which served UE device 10 updates RIS configuration identifier RID may be less than the periodicity with which remote controller 80 updates the UE control model.

At operation 124, local controller 52 on RIS 50 may identify or select the entry of the codebook 76 received from remote controller 80 (e.g., the RIS configuration) corresponding to or identified by the RIS configuration identifier RID received from served UE device 10. RIS 50 may control phase shifters 74 to implement the selected entry of codebook 76 (e.g., to configure antenna elements 48 to exhibit the reflection coefficients COEFF associated with or given by the selected entry of codebook 76).

At operation 126, antenna elements 48 on RIS 50 may reflect data RAT signals between an additional device such as BS 34 (FIGS. 1 and 2) and served UE device 10 while implementing reflection coefficients COEFF (e.g., while configured to implement the RIS configuration from codebook 76 that was identified by RIS configuration identifier RID). Put differently, reflection coefficients COEFF may configure antenna elements 48 to form RIS beams oriented towards BS 34 and served UE device 10 and the RIS beams may be used to reflect data RAT signals between served UE device 10 and BS 34.

Figure 8:
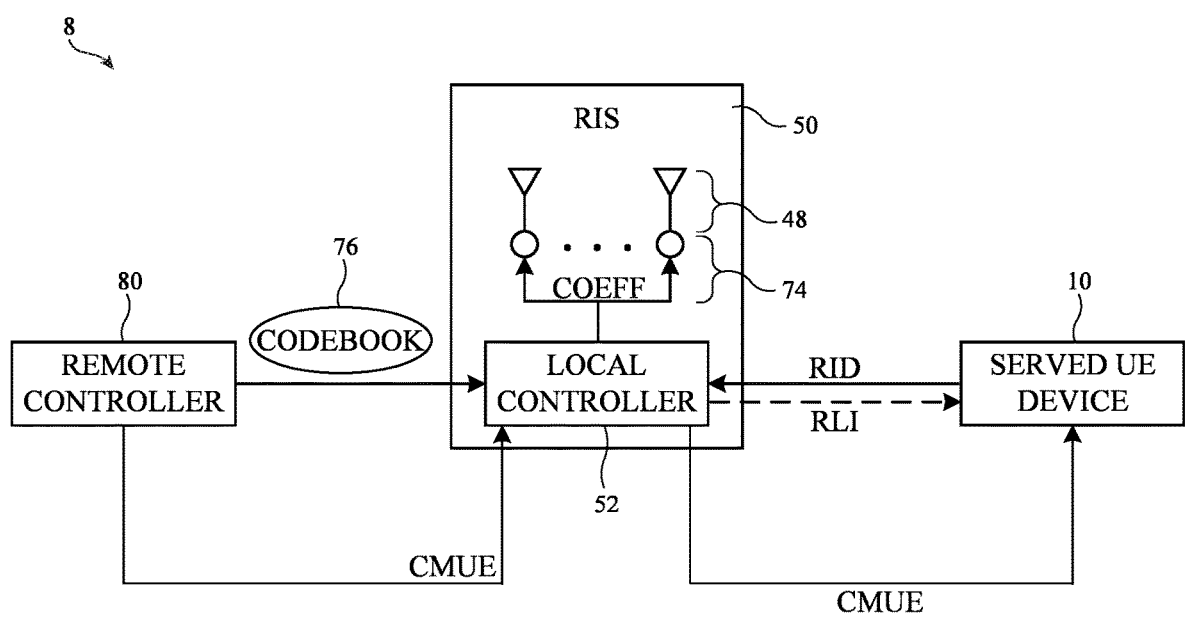
FIG. 8 is a diagram showing how an illustrative RIS may forward a control model received from a remote controller to a UE device for generation of a RIS configuration identifier in accordance with some embodiments.

The example of FIGS. 6 and 7 in which remote controller 80 provides UE control model CMUE to served UE device 10 using the control RAT is illustrative and non-limiting. If desired, remote controller 80 may provide UE control model CMUE to local controller 52, which relays the UE control model CMUE to served UE device 10. FIG. 8 is a diagram showing how remote controller 80 may provide UE control model CMUE to served UE device 10 via local controller 52.

As shown in FIG. 8, remote controller 80 may transmit both UE control model CMUE and codebook 76 to local controller 52 using the control RAT. Local controller 52 may then transmit UE control model CMUE to served UE device 10 using the control RAT. If desired, different control RATs may be used to transmit the UE control model from remote controller 80 to RIS 50 and from RIS 50 to served UE device 10.

Local controller 52 may update UE control model CMUE prior to transmitting UE control model CMUE to served UE device 10 if desired. For example, local controller 52 may update UE control model CMUE based on some or all of RIS local information RLI, based on an AI/ML algorithm, etc. This may, for example, help to refine the efficacy of UE control model CMUE and/or may help to offload some of the processing resources consumed by served UE device 10 in generating RIS configuration identifier RID.

Splitting control procedures for RIS 50 between remote controller 80 and served UE device 10 as shown in FIGS. 4-8 may help to minimize the communication overhead required to configure and re-configure antenna elements 48 on RIS 50. For example, remote controller 80 may update control model CM (FIGS. 4 and 5), UE control model CMUE (FIGS. 6 and 7), and codebook 76 (FIGS. 6 and 7) at a much slower rate than the rate at which the RIS configuration is updated. This may be motivated by channel properties. For example, in many scenarios, the BS-RIS channel is less dynamic than the RIS-UE channel (e.g., because the UE device is more likely to move over time). The period of control model or codebook updates may be configured to be larger than the period of local information updates (FIGS. 4 and 5) or RIS configuration identifier updates (FIGS. 6 and 7).

In addition, splitting control procedures in these ways may allow RIS 50 to provide coverage extension to served UE device 10. For example, so long as served UE device 10 is in the control RAT coverage area of RIS 50, served UE device 10 and local controller 52 may establish local communication to enable the UE device to provide UE local information UELI to RIS 50 (e.g., for generating reflection coefficients COEFF as shown in FIG. 4) regardless of whether served UE device 10 is within the control RAT coverage area of remote controller 80. In addition, splitting control procedures in these ways may improve privacy. For example, in the implementation of FIGS. 4 and 5, local information is only shared between served UE device 10 and local controller 52 and is not exposed to the rest of the network. Local controller 52 may implement a policy that prevents local controller 52 from forwarding UE local information UELI elsewhere in the network, for example. Further, in the implementation of FIGS. 6 and 7, UE device 10 does not share UE local information UELI at all, allowing the local information to remain completely private to served UE device 10.

In some implementations, local controller 52 may only be capable of local communications over relatively short distances using the control RAT. This may help to minimize the resource consumption and cost of RIS 50, for example. In these implementations, local controller 52 may be able to establish a control RAT connection with served UE device 10 but not necessarily with remote controller 80, which might be located farther away. At the same time, served UE device 10 may be able to establish a control RAT connection with remote controller 80 (e.g., because served UE device 10 generally has greater processing and power resources than RIS 50). As such, remote controller 80 may transmit the signals that would otherwise be transmitted to local controller 52 to served UE device 10 for configuring RIS 50.

Figure 9:
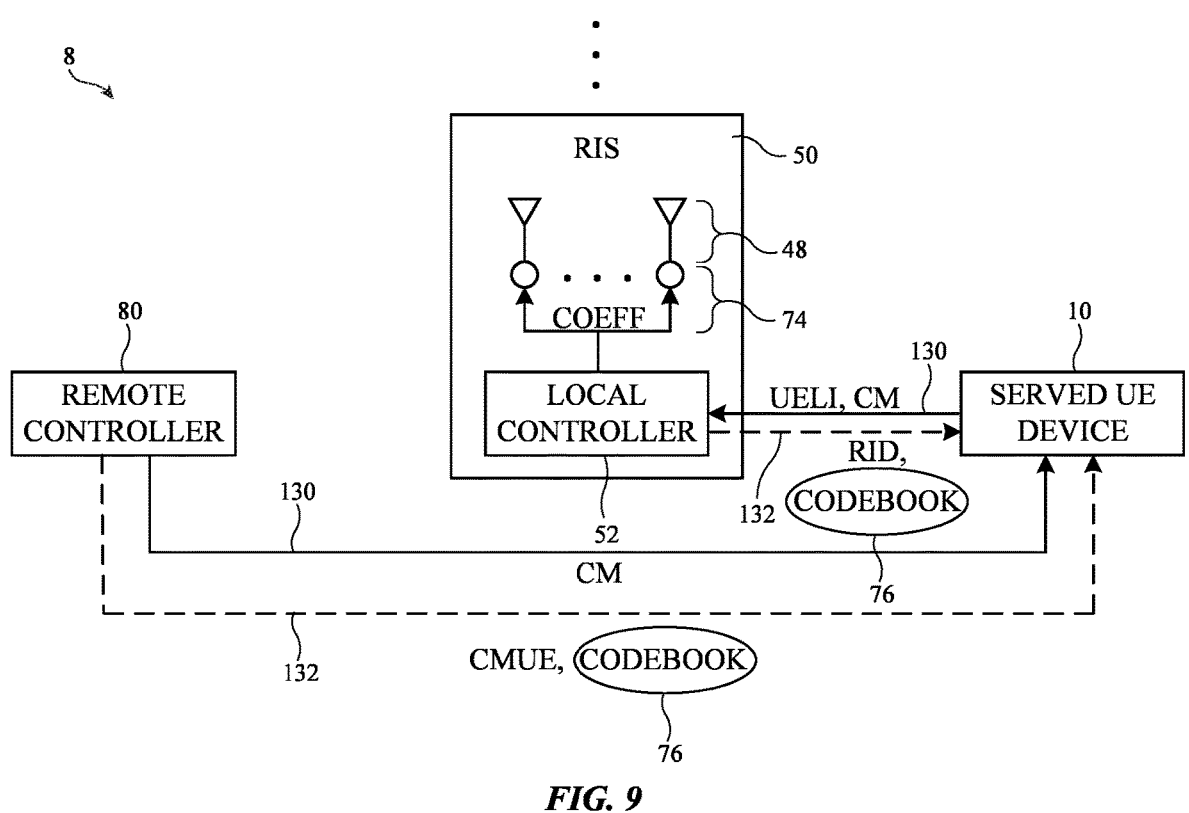
FIG. 9 is a diagram showing how an illustrative RIS may generate its own reflection coefficients when the RIS is unable to communicate with a remote controller in accordance with some embodiments.

FIG. 9 is a diagram showing how remote controller 80 may transmit signals that would otherwise be transmitted to local controller 52 (in the implementations of FIGS. 4-8) to served UE device 10 for configuring RIS 50 (e.g., in implementations where RIS 50 is unable to establish control RAT communications with remote controller 80). In FIG. 9, arrows 130 represent signaling in an implementation where RIS 50 generates reflection coefficients COEFF based on control model CM and UE local information UELI (e.g., using the operations of FIG. 5). Arrows 132 represent signaling in an implementation where RIS 50 generates reflection coefficients COEFF based on codebook 76 generated by remote controller 80 and RIS configuration identifier RID generated by served UE device 10 (e.g., using the operations of FIG. 7).

As shown in FIG. 9, remote controller 80 may transmit control model CM to served UE device 10 using the control RAT. Served UE device 10 may then use the control RAT to transmit (forward or relay) control model CM to RIS 50 along with UE local information UELI. Local controller 52 may generate reflection coefficients COEFF based on control model CM and UE local information UELI (e.g., at operation 98 of FIG. 5).

Alternatively, remote control controller 80 may transmit UE control model CMUE and the paired codebook 76 to served UE device 10 over the control RAT. Served UE device 10 may generate RIS configuration identifier RID based on UE control model CMUE (e.g., at operation 120 of FIG. 7). Served UE device 10 may transmit RIS configuration identifier RID and codebook 76 to RIS 50 using the control RAT. Local controller 52 may generate reflection coefficients COEFF based on RIS configuration identifier RID and codebook 76 (e.g., at operation 124 of FIG. 7).

Figure 10:
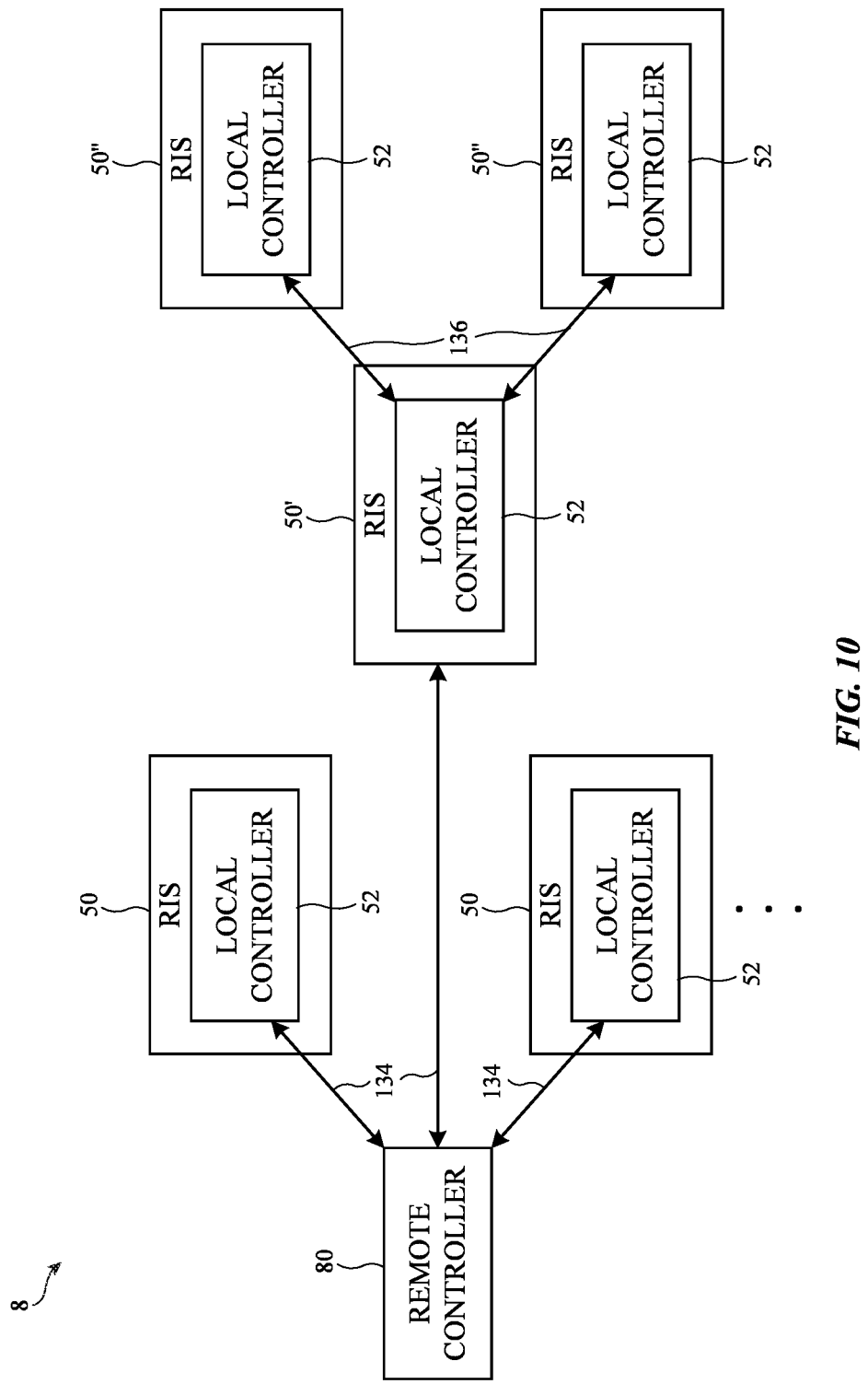
FIG. 10 is a diagram showing how an illustrative remote controller may help to control multiple RIS's in an environment in accordance with some embodiments.

While signaling is described in FIGS. 4-9 as being performed between remote controller 80, a single RIS 50, and a single served UE device 10, the operations of FIGS. 4-9 may be adapted to accommodate multiple RIS's 50 and/or multiple served UE devices 10 in system 8. FIG. 10 shows one example of control RAT signaling that may be performed between remote controller 80 and multiple RIS's 50 in system 8.

As shown in FIG. 10, remote controller 80 may use the control RAT to convey signals 134 with the local controller 52 on multiple RIS's 50 in system 8. Signals 134 may include or convey control model CM of FIG. 4, local training data (LTD) of FIG. 4, updated control model CM' of FIG. 4, reward feedback RFBK of FIG. 4, UE control model CMUE of FIG. 8, codebook 76 of FIG. 8, and/or any other desired information, as examples. Each RIS 50 may serve zero, one, or more than one served UE device 10 (not shown).

If desired, one or more RIS's such as RIS 50' may serve as a control RAT relay between remote controller 80 and one or more RIS's 50" that are located outside of the control RAT coverage area of remote controller 80. For example, RIS 50' may relay or re-transmit signals 134 to and/or from RIS's 50", as shown by signals 136. Remote controller 80 may perform the control split operations of FIGS. 4-9 with each of the RIS's 50 in system 8. If desired, the control model and/or codebook calculations at remote controller 80 may be based on information related to all of the controlled RIS's 50 in system 8. In this way, one or more RIS's 50 in system 8 may effectively extend the area of control RAT coverage for remote controller 80 and thus the area in which RIS's 50 controlled by remote controller 80 may be located.

In some implementations, remote controller 80 may use the control RAT to directly configure the reflection coefficients COEFF on one or more RIS's 50 (e.g., rather than allowing local controller 52 to perform the final computation or selection of reflection coefficients COEFF based on control model CM or based on codebook 76 and RIS configuration identifier RID). For example, remote controller 80 may compute reflection coefficients COEFF and may use the control RAT to transmit the reflection coefficients to local controller 52, together with an indicator that the corresponding message is different from a default message. Local controller 52 may then configure phase shifters 74 using the received reflection coefficients. If desired, one or more of the RIS's 50 in system 8 may be replaced by an active repeater device with beamforming capabilities. The splitting techniques described herein may be used with repeater devices that amplify and forward signals with beamforming (e.g., analog, digital, or hybrid), repeater devices that decode and forward signals with beamforming (e.g., analog, digital, or hybrid), or with active RIS's having digital signal processing (DSP) capabilities and/or active transmission capabilities (e.g., antenna elements 48 that radiate signals produced by a transmitter on the RIS).

Figure 11:
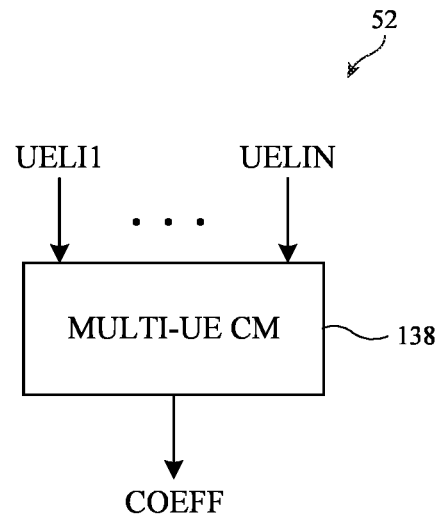
FIG. 11 is a diagram showing how illustrative control circuitry on a RIS may generate reflection coefficients for serving multiple UE devices based on local information from the UE devices and a multi-UE control model received from a remote controller in accordance with some embodiments.

If desired, a given RIS 50 may serve more than one UE device 10. In these scenarios, RIS configuration control may take into account the requirements of all the served UE devices. In the example of FIGS. 4 and 5, control model CM may be a multi-UE control model such as multi-UE control model 138 of FIG. 11. As shown in FIG. 11, multi-UE control model 138 may generate reflection coefficients COEFF based on UE local information UELI received from N different UE devices 10 served by the RIS (e.g., UE local information UELI1 from a first served UE device 10, UE local information UELIN from an Nth served UE device 10, etc.). Remote controller 80 may generate multi-UE control model 138 and may transmit multi-UE control model 138 to RIS 50 using the control RAT (e.g., at operations 90 and 92 of FIG. 5). Remote controller 80 may select the UE devices that are served by RIS 50 when generating multi-UE control model 138.

Figure 12:
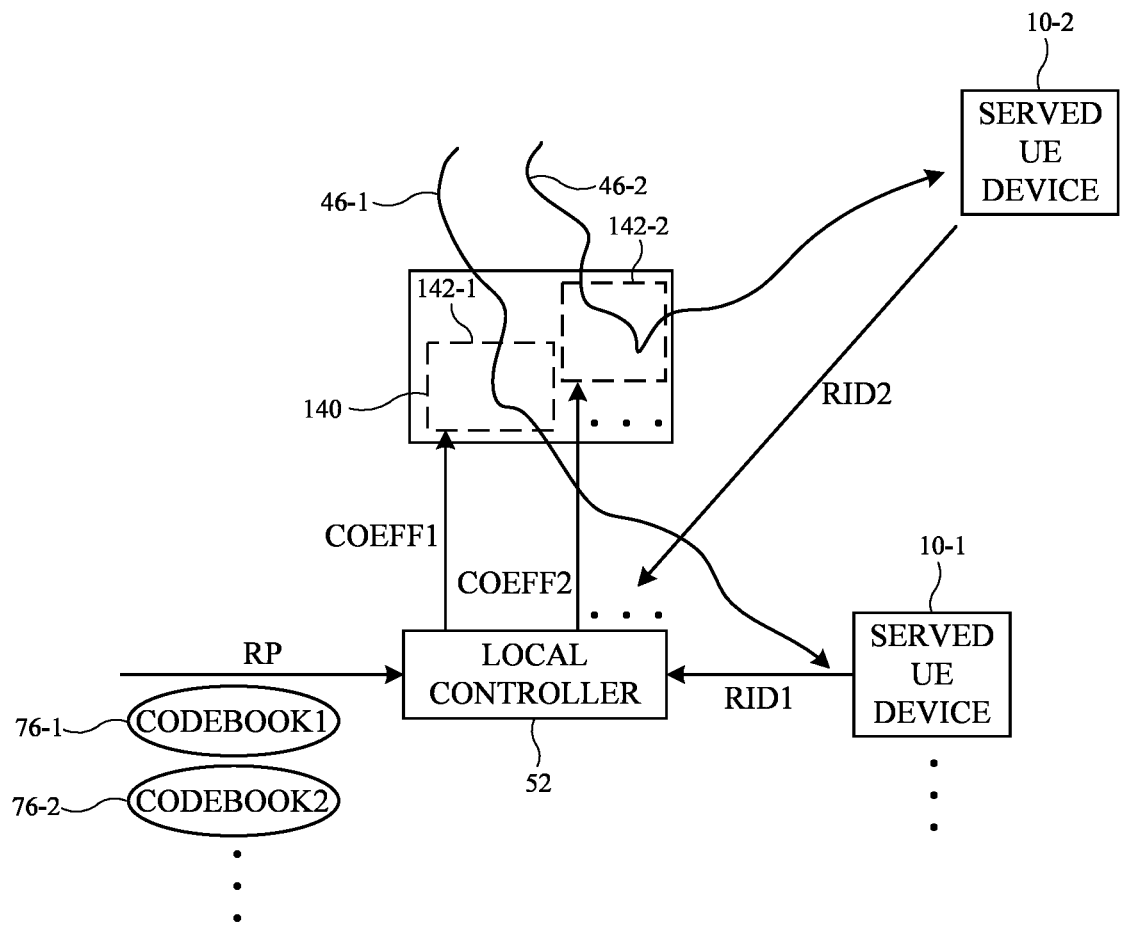
FIG. 12 is a diagram showing how an illustrative RIS may generate different sets of reflection coefficients for serving different UE devices based on multiple codebooks received from a remote controller in accordance with some embodiments.

In the example of FIGS. 6 and 7, remote controller 80 may compute a partition of RIS area (e.g., sets or partitions of antenna elements 48) that are dedicated to serving different UE devices 10. FIG. 12 shows a simplest case in which a given RIS 50 serves a first UE device 10-1 and a second UE device 10-2. As shown in FIG. 12, RIS 50 may have an array 140 of antenna elements 48. Remote controller 80 may generate resource partition information RP identifying a first set (partition) 142-1 of the antenna elements 48 in array 140 for serving UE device 10-1 and a second set (partition) 142-2 of the antenna elements 48 in array 140 for serving UE device 10-2. Remote controller 80 may also generate a first codebook 76-1 for first partition 142-1 (e.g., with phase settings for the antenna elements 48 in partition 142-1 to use in reflecting data RAT signals) and a second codebook 76-2 for second partition 142-2 (e.g., with phase settings for the antenna elements 48 in partition 142-2 to use in reflecting data RAT signals). Remote controller 80 may transmit resource partition information RP, codebook 76-1, and codebook 76 to local controller 52 using the control RAT (e.g., at operation 114 of FIG. 7).

Served UE device 10-1 may generate a first RIS configuration identifier RID1 for RIS 50 to use in configuring partition 142-1 for reflecting data RAT signals to served UE device 10-1 (e.g., at operation 120 of FIG. 7). Served UE device 10-1 may transmit first RIS configuration identifier RID1 to local controller 52 using the control RAT (e.g., at operation 122 of FIG. 7). Similarly, served UE device 10-2 may generate a second RIS configuration identifier RID2 for RIS 50 to use in configuring partition 142-2 for reflecting data RAT signals to served UE device 10-2 (e.g., at operation 120 of FIG. 7). Served UE device 10-2 may transmit second RIS configuration identifier RID2 to local controller 52 using the control RAT (e.g., at operation 122 of FIG. 7).

Local controller 52 may generate first reflection coefficients COEFF1 for partition 142-1 based on RIS configuration identifier RID1 and codebook 76-1 (e.g., at operation 124 of FIG. 7). Local controller 52 may program the phase shifters 74 coupled to the antenna elements 48 in partition 142-1 using reflection coefficients COEFF1 (e.g., at operation 124 of FIG. 7). At the same time, local controller 52 may generate second reflection coefficients COEFF2 for partition 142-2 based on RIS configuration identifier RID2 and codebook 76-2 (e.g., at operation 124 of FIG. 7). Local controller 52 may program the phase shifters 74 coupled to the antenna elements 48 in partition 142-2 using reflection coefficients COEFF2 (e.g., at operation 124 of FIG. 7).

Once configured using reflection coefficients COEFF1, the antenna elements 48 in partition 142-1 may reflect data RAT signals 46-1 between a base station 34 and served UE device 10-1. At the same time, the antenna elements 48 in partition 142-2 may reflect data RAT signals 46-2 between a base station 34 and served UE device 10-2. The example of FIG. 12 is illustrative and non-limiting and may, if desired, be extended to any desired number of served UE devices 10.

UE device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods and operations described above in connection with FIGS. 1-7 may be performed by the components of UE device 10, RIS 50, and/or BS 34 using software, firmware, and/or hardware (e.g., dedicated circuitry or hardware). Software code for performing these operations may be stored on non-transitory computer readable storage media (e.g., tangible computer readable storage media) stored on one or more of the components of UE device 10, RIS 50, and/or BS 34. The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of UE device 10, RIS 50, and/or BS 34. The processing circuitry may include microprocessors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. A method of operating a reconfigurable intelligent surface (RIS), the method comprising:
receiving, using one or more antennas, a first signal from a first electronic device;
receiving, using the one or more antennas, a second signal from a second electronic device that is different from the first electronic device;
reflecting a third signal towards or from the second electronic device using an array of antenna elements, the array of antenna elements being configured to exhibit a set of reflection coefficients selected based on the first signal and the second signal; and
transmitting, using the one or more antennas, information about the RIS to the second electronic device, the second signal being generated by the second electronic device based on the information about the RIS.

2. The method of claim 1, wherein the first signal identifies a function, the second signal identifies information about the second electronic device, and the set of reflection coefficients is selected based on the function and the information about the second electronic device.

3. The method of claim 2, wherein set of reflection coefficients is selected based on information about the RIS.

4. The method of claim 3, wherein the information about the RIS comprises information about which antenna elements in the array are inactive, a position of the RIS, or an orientation of the RIS.

5. The method of claim 2, wherein the information about the second electronic device comprises a position of the second electronic device, an orientation of the second electronic device, or channel state information between the RIS and the second electronic device.

6. The method of claim 1, wherein the first signal identifies a codebook for the array of antenna elements and the second signal identifies an entry of the codebook associated with the set of reflection coefficients.

7. The method of claim 6, wherein the first signal further identifies a function, the method further comprising:
transmitting, using the one or more antennas, a fourth signal to the second electronic device that identifies the function, the second signal being generated by the second electronic device based on the function.

8. The method of claim 7, further comprising:
updating, at one or more processors, the function based on information about the RIS prior to transmitting the fourth signal to the second electronic device.

9. The method of claim 6, wherein reflecting the third signal includes reflecting the third signal using a first partition of the array of antenna elements, the first signal identifies an additional codebook for the array of antenna elements, and the method further comprises:
receiving, using the one or more antennas, a fourth signal from a third electronic device that is different from the second electronic device and the first electronic device, the fourth signal identifying an entry of the additional codebook associated with an additional set of reflection coefficients; and
reflecting a fifth signal towards the third electronic device using a second partition of the array of antenna elements, the second partition of the array of antenna elements being configured to exhibit the additional set of reflection coefficients.

10. The method of claim 1, wherein the second electronic device comprises a user equipment (UE) device and reflecting the third signal towards the second electronic device comprises reflecting the third signal from a wireless base station towards the second electronic device.

11. The method of claim 1, wherein reflecting the third signal towards the second electronic device comprises reflecting the third signal from the first electronic device towards the second electronic device.

12. A method of operating a first electronic device, the method comprising:
receiving, at a receiver, a first signal from a second electronic device, wherein the first signal identifies a function having an input that includes information about the second electronic device;
transmitting, using a transmitter, a second signal to a reconfigurable intelligent surface (RIS), the second signal identifying a configuration for antenna elements on the RIS that is selected, from a set of configurations for the antenna elements stored at the RIS, based on the first signal, wherein information identifying the configuration for the antenna elements from the set of configurations for the antenna elements is output by the function; and transmitting a third signal towards the RIS using one or more antennas, the RIS being configured to reflect the third signal based on the configuration for the antenna elements identified by the second signal.

13. The method of claim 12, wherein the configuration for the antenna elements from the set of configurations for the antenna elements is selected based on information about the first electronic device.

14. The method of claim 13, wherein the first signal further identifies the set of configurations for the antenna elements, the method further comprising:
transmitting the set of configurations for the antenna elements to the RIS using the transmitter.

15. The method of claim 13, wherein the information about the first electronic device comprises a position of the first electronic device, an orientation of the first electronic device, or channel state information between the RIS and the first electronic device.

16. The method of claim 12, further comprising:
receiving a fourth signal from the RIS that identifies information about the RIS, the configuration for the antenna elements from the set of configurations for the antenna elements being selected based on the information about the RIS.

17. A method of operating a first electronic device, the method comprising:
transmitting, with one or more antennas, a set of configurations for an array of antenna elements on a reconfigurable intelligent surface (RIS) to the RIS; and
transmitting, with the one or more antennas, a function to a second electronic device, the second electronic device being configured to transmit a signal to the RIS identifying a configuration from the set of configurations that is selected by the second electronic device based on the function and information about the second UE device, wherein
the function has an input that receives information about the first electronic device and outputs information identifying the configuration.

18. The method of claim 17, further comprising:
transmitting, with a transmitter, a signal to the second electronic device that is reflected off the RIS, the RIS being configured to exhibit a set of reflection coefficients associated with configuration from the set of configurations that is selected by the second electronic device.

* * * * *